(12) United States Patent
Nakajima et al.

(10) Patent No.: US 10,289,357 B2
(45) Date of Patent: May 14, 2019

(54) REMOTE COMMUNICATION SYSTEM THAT IMPROVES SECURITY OF REMOTE SESSION BETWEEN IMAGE FORMING APPARATUS AND CONNECTION TERMINAL

(71) Applicant: KYOCERA Document Solutions Inc., Osaka (JP)

(72) Inventors: Koki Nakajima, Osaka (JP); Takeshi Nakamura, Osaka (JP); Keisuke Fukushima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/994,647

(22) Filed: May 31, 2018

(65) Prior Publication Data
US 2019/0004741 A1    Jan. 3, 2019

(30) Foreign Application Priority Data

Jun. 30, 2017  (JP) ................................ 2017-128665

(51) Int. Cl.
| | | |
|---|---|---|
| *G06K 15/00* | (2006.01) | |
| *G06F 3/12* | (2006.01) | |
| *H04L 29/06* | (2006.01) | |
| *H04L 29/08* | (2006.01) | |

(52) U.S. Cl.
CPC ............ *G06F 3/121* (2013.01); *G06F 3/1222* (2013.01); *G06F 3/1236* (2013.01); *G06F 3/1238* (2013.01); *G06F 3/1288* (2013.01); *H04L 65/1069* (2013.01); *H04L 67/02* (2013.01); *H04L 67/141* (2013.01); *H04L 67/143* (2013.01); *H04L 63/0281* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 2003/0200289 A1* | 10/2003 | Kemp ................... | G06F 3/1204 709/221 |
| 2006/0195495 A1 | 8/2006 | Asano .......................... | 708/111 |

(Continued)

FOREIGN PATENT DOCUMENTS

JP    2006-238199 A    9/2006

*Primary Examiner* — Henok Shiferaw
(74) *Attorney, Agent, or Firm* — Stein IP, LLC

(57) ABSTRACT

A remote communication system according to one aspect of the disclosure includes an image forming apparatus, an electronic device, a session relay system, and a session management unit. When a start of a test for a communication state via the session is requested by the electronic device, the session management unit requests the session relay system for a first test ID as the first session ID and a second test ID as the second session ID. When the session is relayed by the session relay system by associating the connection established between the electronic device and the session relay system with the connection established between the image forming apparatus and the session relay system using the first test ID and the second test ID, the image forming apparatus executes the test for the communication state with the electronic device via the relayed session.

6 Claims, 23 Drawing Sheets

(56) References Cited

U.S. PATENT DOCUMENTS

| | | | |
|---|---|---|---|
| 2015/0055165 A1* | 2/2015 | Fukushima | H04N 1/00079 358/1.14 |
| 2016/0019010 A1* | 1/2016 | Nakamura | G06F 3/1204 358/1.15 |
| 2016/0147980 A1* | 5/2016 | Yasui | G06F 21/105 726/26 |
| 2016/0156484 A1* | 6/2016 | Matsuhara | H04L 12/4633 709/227 |
| 2016/0189168 A1* | 6/2016 | Nakamura | G06Q 30/018 705/317 |
| 2017/0078512 A1* | 3/2017 | Mochizuki | H04L 41/5074 |

* cited by examiner

REMOTE COMMUNICATION SYSTEM THAT IMPROVES SECURITY OF REMOTE SESSION BETWEEN IMAGE FORMING APPARATUS AND CONNECTION TERMINAL

INCORPORATION BY REFERENCE

This application is based upon, and claims the benefit of priority from, corresponding Japanese Patent Application No. 2017-128665 filed in the Japan Patent Office on Jun. 30, 2017, the entire contents of which are incorporated herein by reference.

BACKGROUND

Unless otherwise indicated herein, the description in this section is not prior art to the claims in this application and is not admitted to be prior art by inclusion in this section.

There is known a system that executes a communication between an image forming apparatus and an electronic device located inside a Local Area Network (LAN) to which the image forming apparatus belongs. This system causes the image forming apparatus to display a User Interface (UI) screen generated by the electronic device and causes the image forming apparatus to execute a print job based on print data accumulated in the electronic device.

SUMMARY

A remote communication system according to one aspect of the disclosure includes an image forming apparatus, an electronic device, a session relay system, and a session management unit. The electronic device is located outside a network to which the image forming apparatus belongs. The session relay system relays a session between the image forming apparatus and the electronic device. The session management unit manages the session. The session relay system notifies a first session ID and a second session ID to the session management unit. The first session ID and the second session ID are session IDs to identify communication by the session in the session relay system. The session management unit executes a notification of the first session ID to the electronic device and a notification of the second session ID to the image forming apparatus. The electronic device establishes a connection with the session relay system. The connection uses the first session ID. The image forming apparatus establishes a connection with the session relay system. The connection uses the second session ID. The session relay system is a remote communication system that relays the session by associating the connection established with the electronic device with the connection established with the image forming apparatus using the first session ID and the second session ID. When a start of a test for a communication state via the session is requested by the electronic device, the session management unit requests a first test ID as the first session ID and a second test ID as the second session ID from the session relay system. When the session is relayed by the session relay system by associating the connection established between the electronic device and the session relay system with the connection established between the image forming apparatus and the session relay system using the first test ID and the second test ID, the image forming apparatus executes the test for the communication state with the electronic device via the relayed session. The electronic device notifies an execution result of the test.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
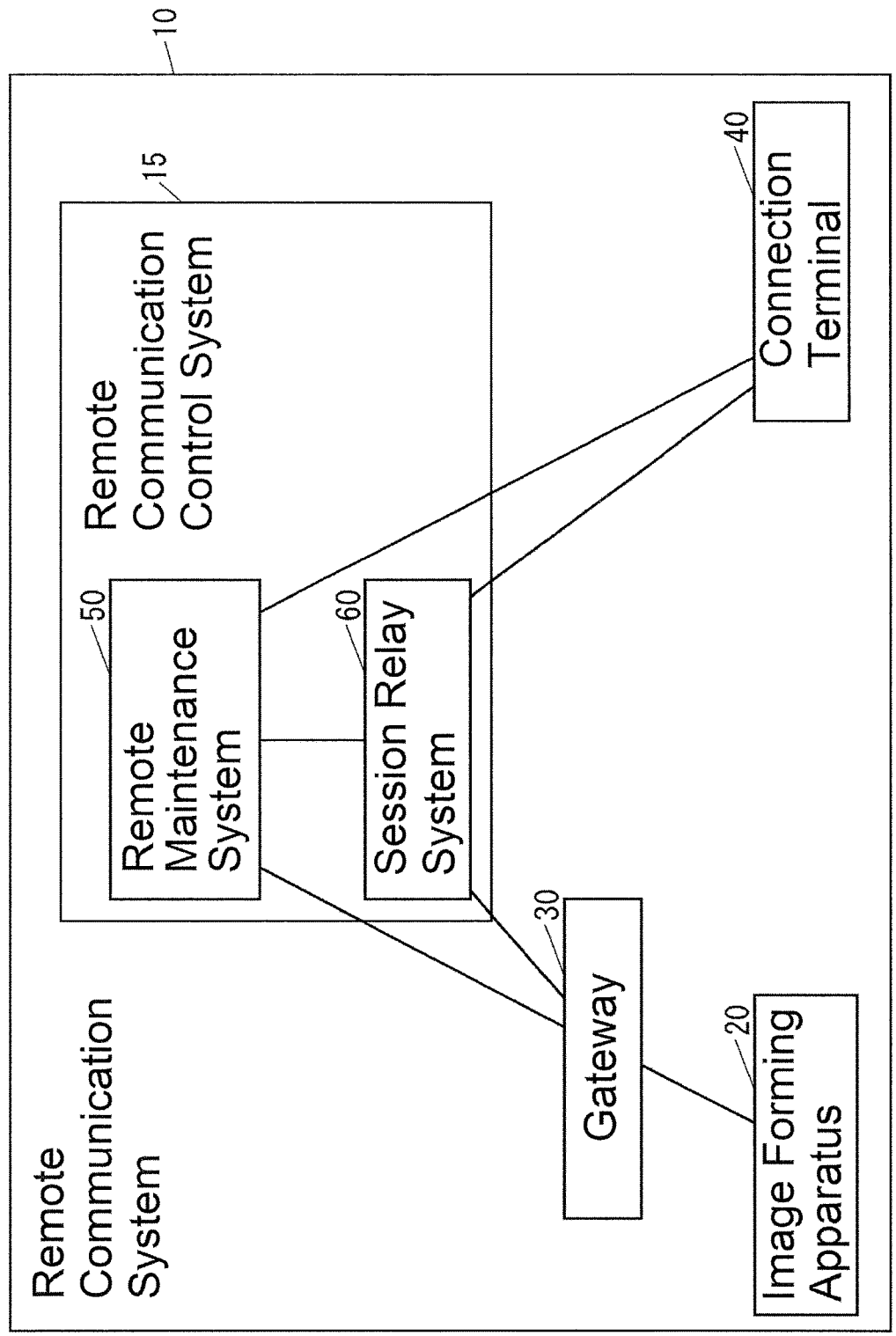
FIG. 1 illustrates a block diagram of a remote communication system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a configuration of a remote communication system according to the embodiment will be described.

FIG. 1 illustrates a block diagram of a remote communication system 10 according to the embodiment.

As illustrated in FIG. 1, the remote communication system 10 includes an image forming apparatus 20, a gateway 30, a connection terminal 40, and a remote communication control system 15. The gateway 30 connects a network, such as a Local Area Network (LAN), to which the image forming apparatus 20 belongs, to a network, such as the Internet. The connection terminal 40 is an electronic device located outside the network to which the image forming apparatus 20 belongs. The remote communication control system 15 controls a communication between the image forming apparatus included in the remote communication system 10 and the connection terminal included in the remote communication system 10.

The remote communication control system 15 includes a remote maintenance system 50 and a session relay system 60. The remote maintenance system 50 is a cloud service that executes a remote maintenance to the image forming apparatus included in the remote communication system 10 corresponding to an instruction from the connection terminal included in the remote communication system 10. The session relay system 60 is a cloud service that relays a direct interconnection between the image forming apparatus included in the remote communication system 10 and the connection terminal included in the remote communication system 10, that is, a Peer to Peer session (hereinafter referred to as a "remote session").

The remote communication system 10 can include an image forming apparatus in addition to the image forming apparatus 20 in the network to which the image forming apparatus 20 belongs. The remote communication system 10 can include a network to which an image forming apparatus belongs in addition to the network to which the image forming apparatus 20 belongs. The image forming apparatus included in the remote communication system 10 is, for example, an image forming apparatus, such as a Multifunction Peripheral (MFP), a printer-only machine, a copy-only machine, a FAX-only machine, and a scanner-only machine.

The gateway 30 configures a firewall that prevents an attack to an inside of the network to which the image forming apparatus 20 belongs from an outside of this network. Therefore, a communication between the image forming apparatus included in the remote communication system 10 and the remote maintenance system 50 is maintained by keeping the image forming apparatus included in the remote communication system 10 connecting to the remote maintenance system 50 by an Extensible Messaging and Presence Protocol (XMPP).

The remote communication system 10 can include a connection terminal in addition to the connection terminal 40. The connection terminal included in the remote communication system 10 is, for example, a computer, such as a Personal Computer (PC).

The remote maintenance system 50 is constituted of, for example, a server computer. The remote maintenance executed by the remote maintenance system 50 is, for example, maintenance, such as a confirmation of a counter of the image forming apparatus and an installation of firmware to the image forming apparatus. The remote maintenance system 50 not only executes the remote maintenance but also manages a remote session. That is, the remote maintenance system 50 configures the session management system.

The session relay system 60 is constituted of, for example, a server computer.

The image forming apparatus included in the remote communication system 10 and the remote maintenance system 50 can communicate via a network, such as the Internet. The image forming apparatus included in the remote communication system 10 and the session relay system 60 can communicate via a network, such as the Internet. The connection terminal included in the remote communication system 10 and the remote maintenance system 50 can communicate via a network, such as the Internet. The connection terminal included in the remote communication system 10 and the session relay system 60 can communicate via a network, such as the Internet. The remote maintenance system 50 and the session relay system 60 can communicate via a network, such as the Internet.

Figure 2:
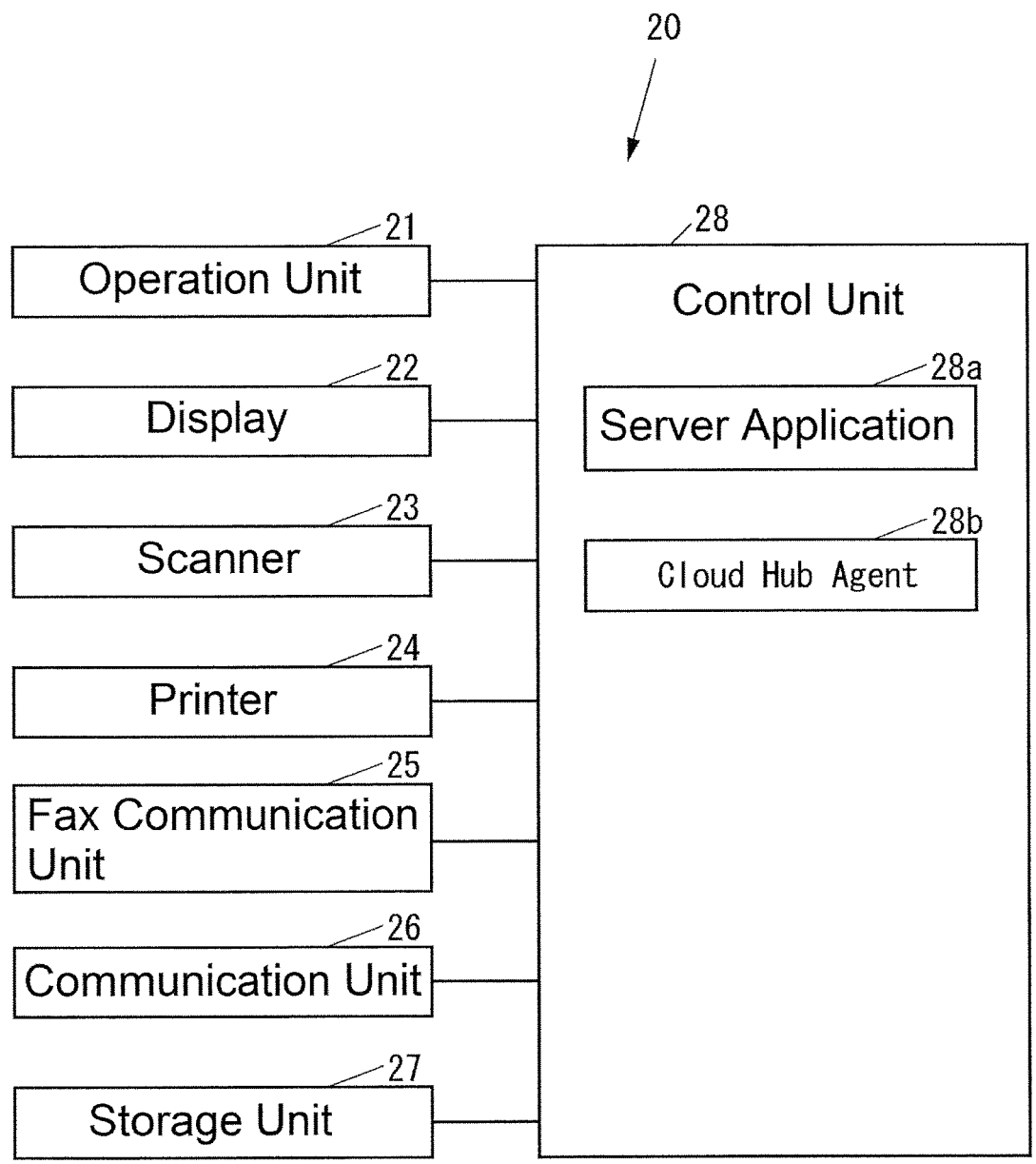
FIG. 2 illustrates a block diagram when an image forming apparatus according to the one embodiment is an MFP.

FIG. 2 illustrates a block diagram when the image forming apparatus 20 is an MFP.

The image forming apparatus 20 illustrated in FIG. 2 includes an operation unit 21, a display 22, a scanner 23, a printer 24, a fax communication unit 25, a communication unit 26, a storage unit 27, and a control unit 28. The operation unit 21 is an input device, such as buttons, with which various kinds of operations are input. The display 22 is a display device, such as a Liquid Crystal Display (LCD), that displays various pieces of information. The scanner 23 is a reading device that reads an image from an original document. The printer 24 is a print device that prints the image on a recording medium, such as a paper sheet. The fax communication unit 25 is a facsimile device that carries out fax communication with an external fax device (not illustrated) via a communication line, such as a dial-up line. The communication unit 26 is a communication device that communicates with an external device via a network or directly with wire or wireless without a network. The storage unit 27 is a non-volatile storage device, such as a semiconductor memory and a Hard Disk Drive (HDD), that stores various pieces of information. The control unit 28 controls the whole image forming apparatus 20.

The control unit 28 includes, for example, a Central Processing Unit (CPU), a Read Only Memory (ROM) that stores programs and various data, and a Random Access Memory (RAM) used as a work area for the CPU. The CPU executes the programs stored in the ROM or the storage unit 27.

The control unit 28 executes the programs stored in the ROM or the storage unit 27 to implement a server application 28a used from the connection terminal included in the remote communication system 10 via the remote session and a Cloud Hub Agent 28b that controls a communication with the session relay system 60 (see FIG. 1).

The control unit 28 can implement a server application in addition to the server application 28a by executing the programs stored in the ROM or the storage unit 27.

The server application implemented by the control unit 28 includes, for example, a Web Server that notifies the outside of the network to which the image forming apparatus 20 belongs of various setting conditions of the image forming apparatus 20 and accepts various settings of the image forming apparatus 20 from the outside of the network to which the image forming apparatus 20 belongs. Additionally, the server application implemented by the control unit 28 includes, for example, a Remote APP Server that transmits data of a screen (for example, a Webpage) displayed on the display 22 of the image forming apparatus 20 to the outside of the network to which the image forming apparatus 20 belongs and receives an operation to the screen displayed based on this data from the outside of the network to which the image forming apparatus 20 belongs to cause the image forming apparatus 20 to operate corresponding to the received operation.

The server application implemented by the control unit 28 can be identified by an application ID.

Figure 3:
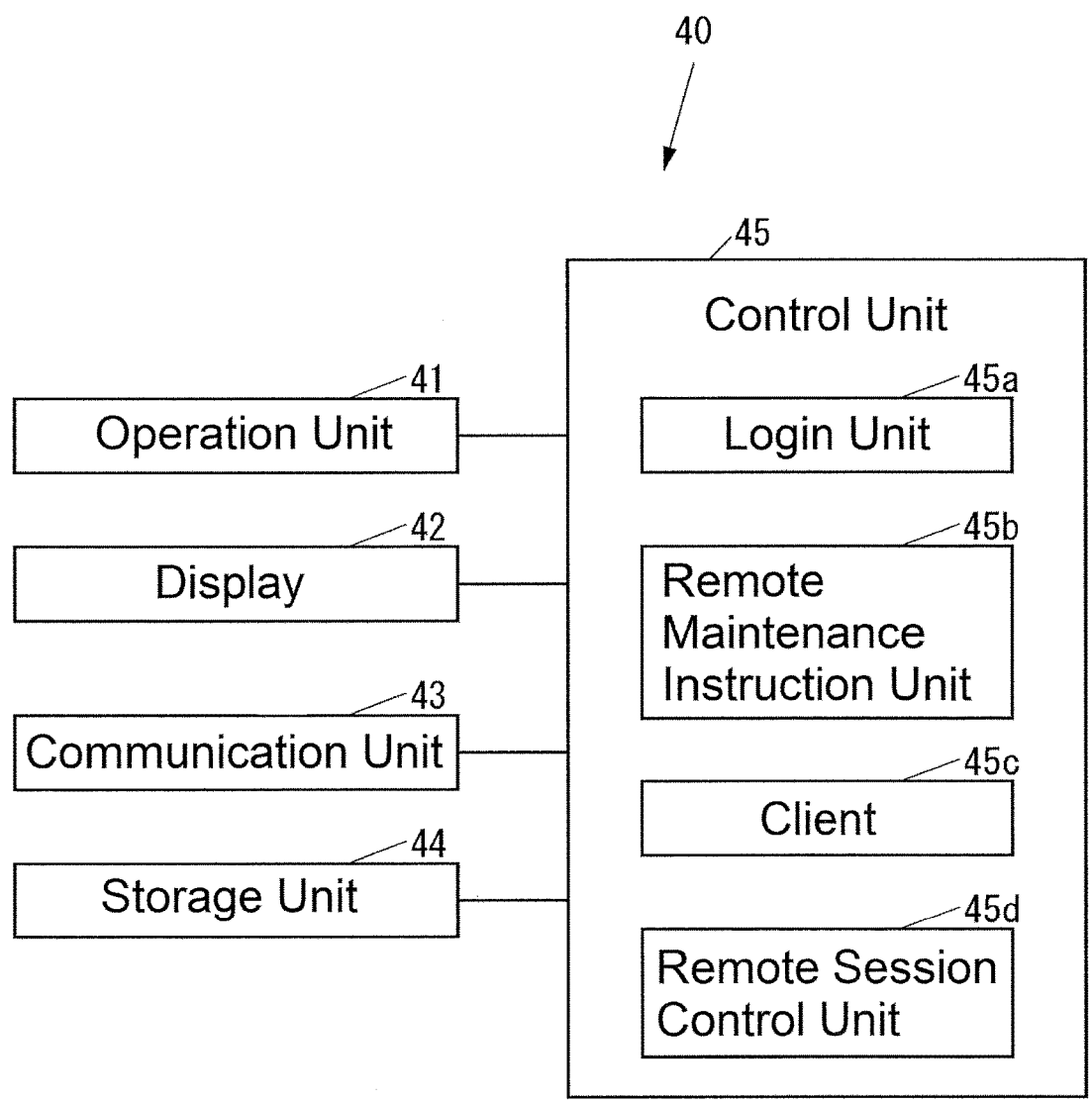
FIG. 3 illustrates a block diagram of a connection terminal according to the one embodiment.

FIG. 3 illustrates a block diagram of the connection terminal 40.

As illustrated in FIG. 3, the connection terminal 40 includes an operation unit 41, a display 42, a communication unit 43, a storage unit 44, and a control unit 45. The operation unit 41 is an input device, such as a keyboard and a mouse, with which various kinds of operations are input. The display 42 is a display device, such as an LCD, that displays various pieces of information. The communication unit 43 is a communication device that communicates with an external device via the network or directly with wire or wireless without the network. The storage unit 44 is a non-volatile storage device, such as a semiconductor memory and an HDD, that stores various pieces of information. The control unit 45 controls the whole connection terminal 40.

The control unit 45 includes, for example, a CPU, a ROM that stores programs and various data, and a RAM used as a work area for the CPU. The CPU executes the programs stored in the ROM or the storage unit 44.

The control unit 45 executes the programs stored in the ROM or the storage unit 44 to implement a login unit 45a, a remote maintenance instruction unit 45b, a client 45c, and a remote session control unit 45d. The login unit 45a executes a login process to the remote maintenance system 50. The remote maintenance instruction unit 45b instructs the remote maintenance to the remote maintenance system 50. The client 45c uses the server application of the image forming apparatus included in the remote communication system 10 via the remote session. The remote session control unit 45d controls the remote session.

The control unit 45 can implement a client in addition to the client 45c by executing the programs stored in the ROM or the storage unit 44.

The client implemented by the control unit 45 includes, for example, a Web Browser that displays a setting condition notified from the Web Server as the server application on the display 42 and instructs various kinds of settings input from the operation unit 41 to this Web Server. Additionally, the client implemented by the control unit 45 includes, for example, an application, such as a Remote APP Client, that displays a screen based on data of a screen received from a Remote APP Server as a server application on the display 42 and transmits the operation input to this screen from the operation unit 41 to this Remote APP Server.

The client implemented by the control unit 45 can be identified by an application ID. The application ID for identifying the client implemented by the control unit 45 is identical to the application ID for identifying the server application of the image forming apparatus corresponding to this client.

Figure 4:
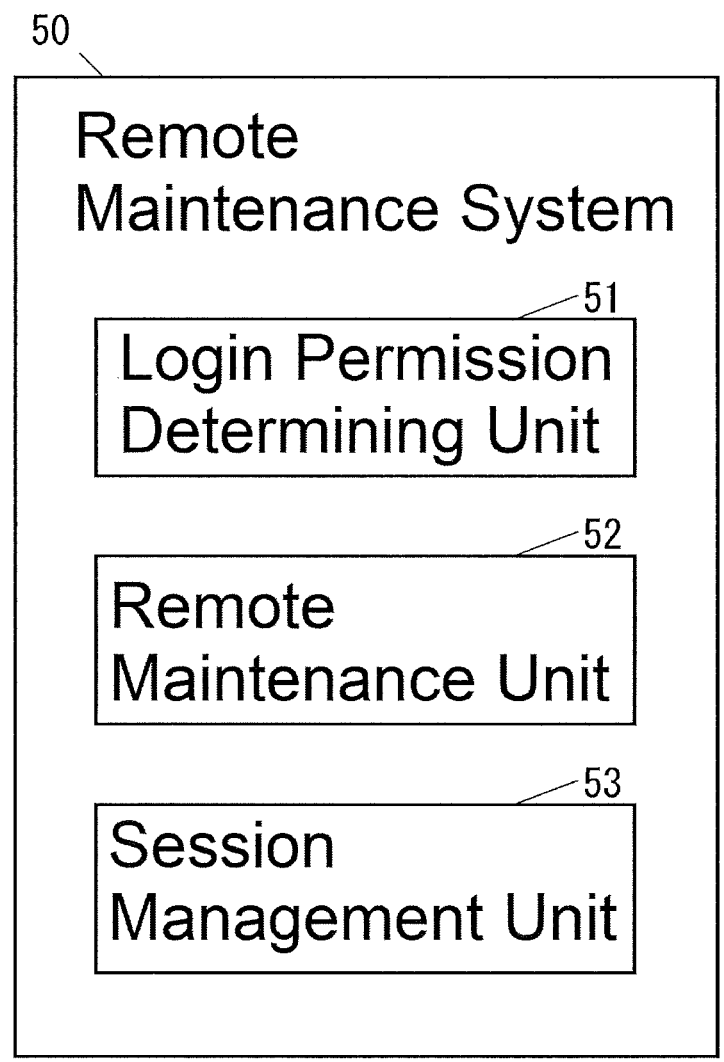
FIG. 4 illustrates a function implemented by a remote maintenance system according to the one embodiment.

FIG. 4 illustrates a function implemented by the remote maintenance system 50.

As illustrated in FIG. 4, the remote maintenance system 50 executes a specific program to implement a login permission determining unit 51, a remote maintenance unit 52, and a session management unit 53. The login permission determining unit 51 determines whether a login of a user is permitted or not. The remote maintenance unit 52 executes the remote maintenance. The session management unit 53 manages the remote session.

Figure 5:
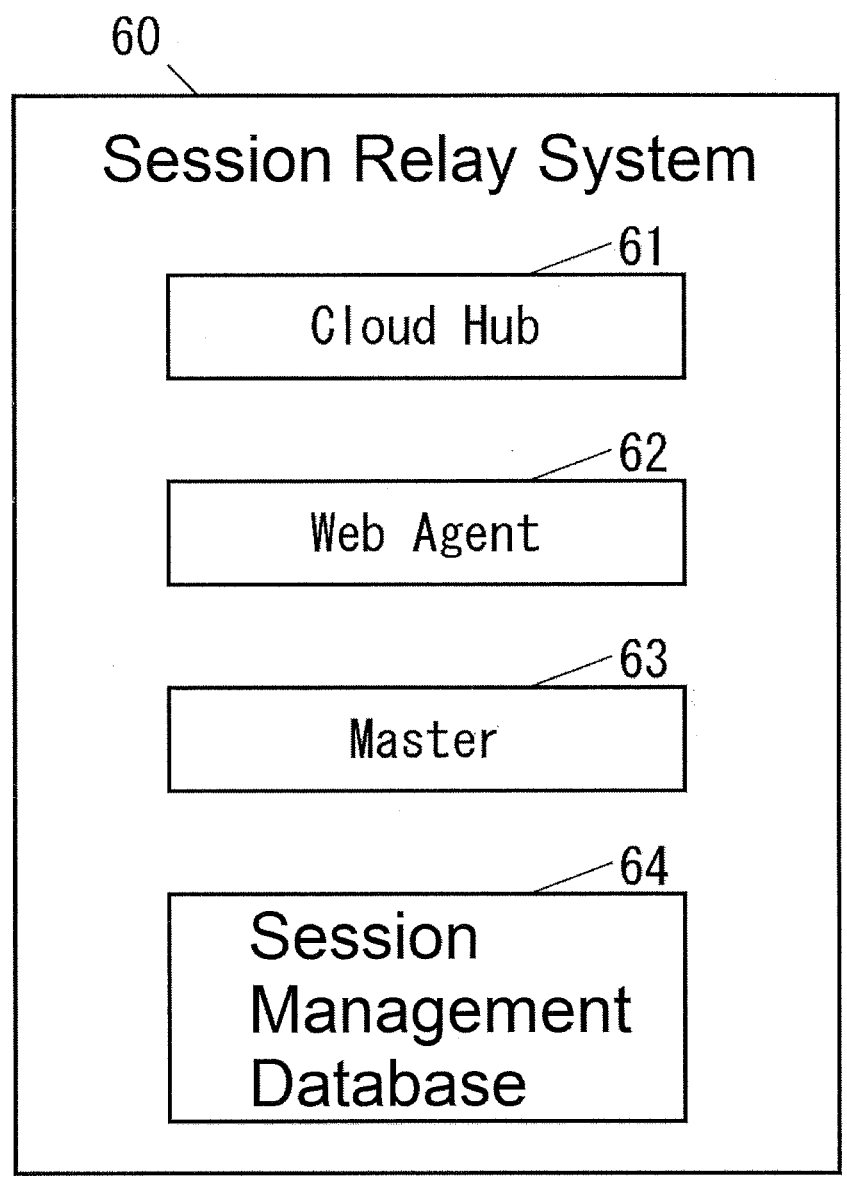
FIG. 5 illustrates a function implemented by a session relay system according to the one embodiment.

FIG. 5 illustrates a function implemented by the session relay system 60.

As illustrated in FIG. 5, the session relay system 60 executes a specific program to implement a Cloud Hub 61 that controls a communication with the image forming apparatus included in the remote communication system 10. The session relay system 60 executes a specific program so as to ensure implementing a Cloud Hub in addition to the Cloud Hub 61.

The session relay system 60 executes a specific program to implement a Web Agent 62 that controls a communication with the connection terminal included in the remote communication system 10. The session relay system 60 executes a specific program so as to ensure implementing a Web Agent in addition to the Web Agent 62.

The session relay system 60 executes a specific program to implement a Master 63 and a session management database 64. The Master 63 determines which Cloud Hub is connected to the image forming apparatus and which Web Agent is connected to the connection terminal. The session management database 64 stores a log relating to the remote session.

The Cloud Hub included in the session relay system 60 and the Web Agent included in the session relay system 60 are in a relationship on a one-to-one basis. That is, a count of the Cloud Hub included in the session relay system 60 and a count of the Web Agent included in the session relay system 60 are identical.

When the image forming apparatus included in the remote communication system 10 is connected to the session relay system 60, the Master 63 determines which Cloud Hub is connected to this image forming apparatus. However, an operation of the Master 63 will not be further elaborated below.

Similarly, when the connection terminal included in the remote communication system 10 is connected to the session relay system 60, the Master 63 determines which Web Agent is connected to this connection terminal. However, an operation of the Master 63 will not be further elaborated below.

Next, an operation of the remote communication system 10 will be described.

First, an operation of the remote communication system 10 when a user of the connection terminal 40 logs in to the remote maintenance system 50 will be described.

Figure 6:
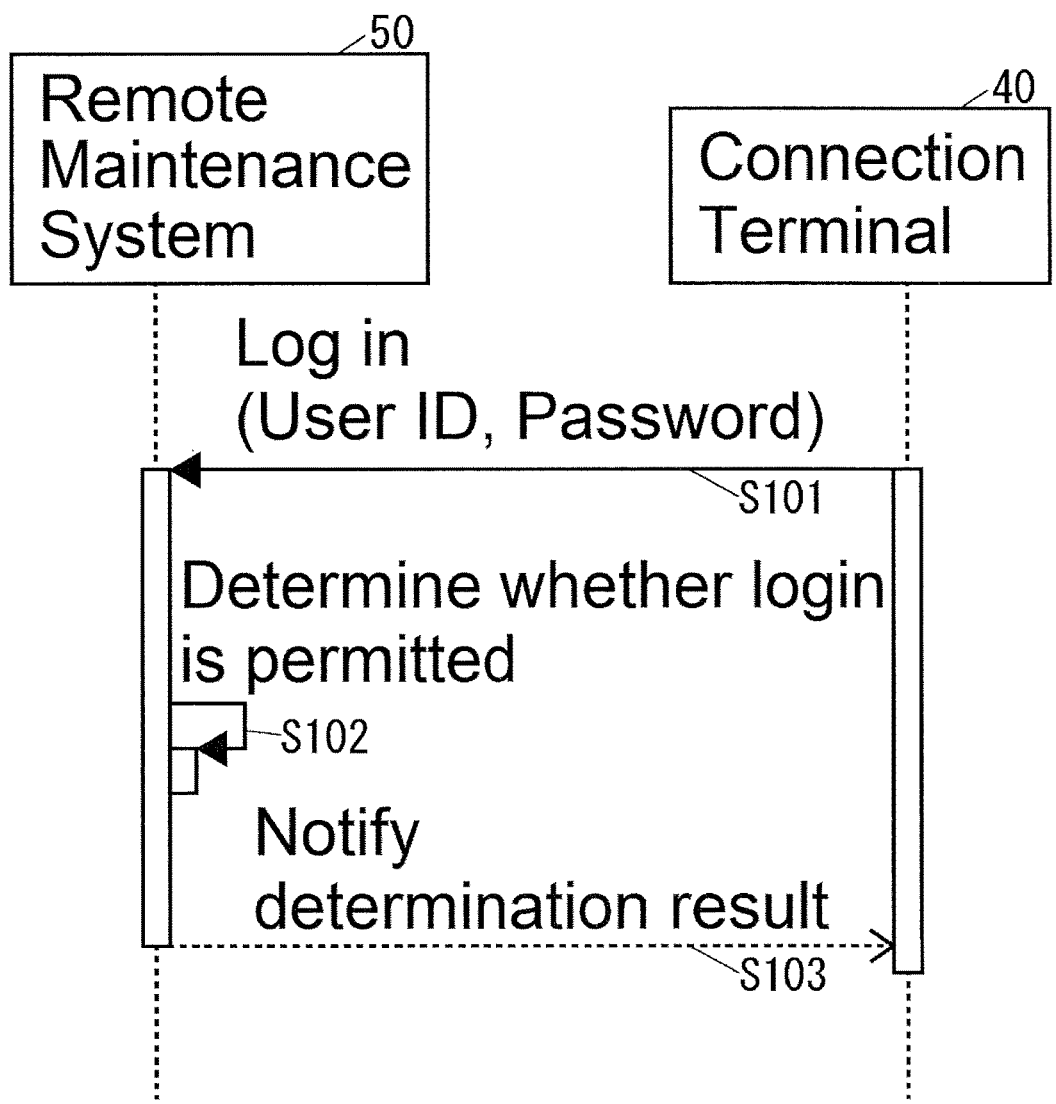
FIG. 6 illustrates an operation of the remote communication system according to the one embodiment when a user of the connection terminal logs in to the remote maintenance system.

FIG. 6 illustrates the operation of the remote communication system 10 when the user of the connection terminal 40 logs in to the remote maintenance system 50.

The user of the connection terminal 40 can instruct a login to the remote maintenance system 50 by inputting a user ID and a password via the operation unit 41. When accepting the instruction to log in to the remote maintenance system 50, the login unit 45a of the connection terminal 40 notifies the remote maintenance system 50 of the user ID and the password input via the operation unit 41 as illustrated in FIG. 6 to execute a login process to the remote maintenance system 50 (Step S101).

The login permission determining unit 51 of the remote maintenance system 50 determines whether the login of the user is permitted or not based on a combination of the user ID and the password notified from the connection terminal 40 when the connection terminal 40 requests the login (Step S102), and replies a determination result to the connection terminal 40 (Step S103).

Next, an operation of the remote communication system 10 when the remote maintenance is executed via the remote maintenance system 50 will be described.

Figure 7:
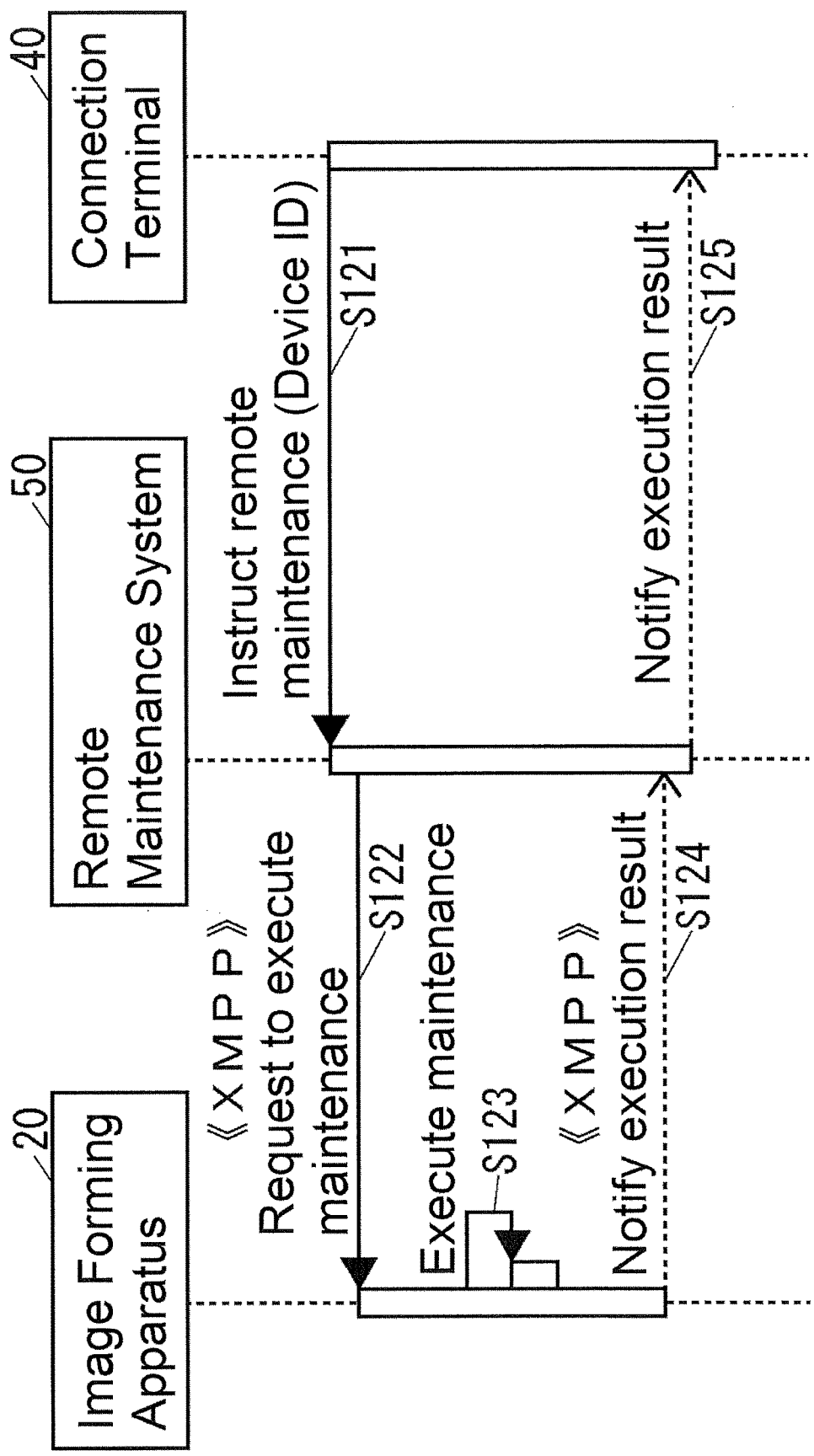
FIG. 7 illustrates an operation of the remote communication system according to the one embodiment when a remote maintenance is executed via the remote maintenance system.

FIG. 7 illustrates the operation of the remote communication system 10 when the remote maintenance is executed via the remote maintenance system 50.

When being logged in to the remote maintenance system 50, the user of the connection terminal 40 can instruct the remote maintenance of a specific image forming apparatus (hereinafter described as the image forming apparatus 20 in the description of the operation illustrated in FIG. 7) via the remote maintenance system 50. This remote maintenance is instructed via the operation unit 41. When accepting the instruction of the remote maintenance via the remote maintenance system 50, the remote maintenance instruction unit 45b of the connection terminal 40 notifies the remote maintenance system 50 of a device ID of the image forming apparatus 20 instructed via the operation unit 41 as illustrated in FIG. 7 to instruct the remote maintenance instructed via the operation unit 41 to the remote maintenance system 50 (Step S121).

When being instructed the remote maintenance from the connection terminal 40, the remote maintenance unit 52 of the remote maintenance system 50 requests the image forming apparatus 20 designated as a target of the remote maintenance from the connection terminal 40 to execute the maintenance instructed from the connection terminal 40 by the XMPP (Step S122).

When the remote maintenance system 50 requests the maintenance, the control unit 28 of the image forming apparatus 20 executes the maintenance requested by the remote maintenance system 50 (Step S123), and notifies the remote maintenance system 50 of an execution result of the maintenance by the XMPP (Step S124).

When the execution result of the maintenance is notified from the image forming apparatus 20, the remote maintenance unit 52 of the remote maintenance system 50 notifies the connection terminal 40 of the execution result notified from the image forming apparatus 20 (Step S125).

Next, an operation of the remote communication system 10 when the remote session is started will be described.

Figure 8:
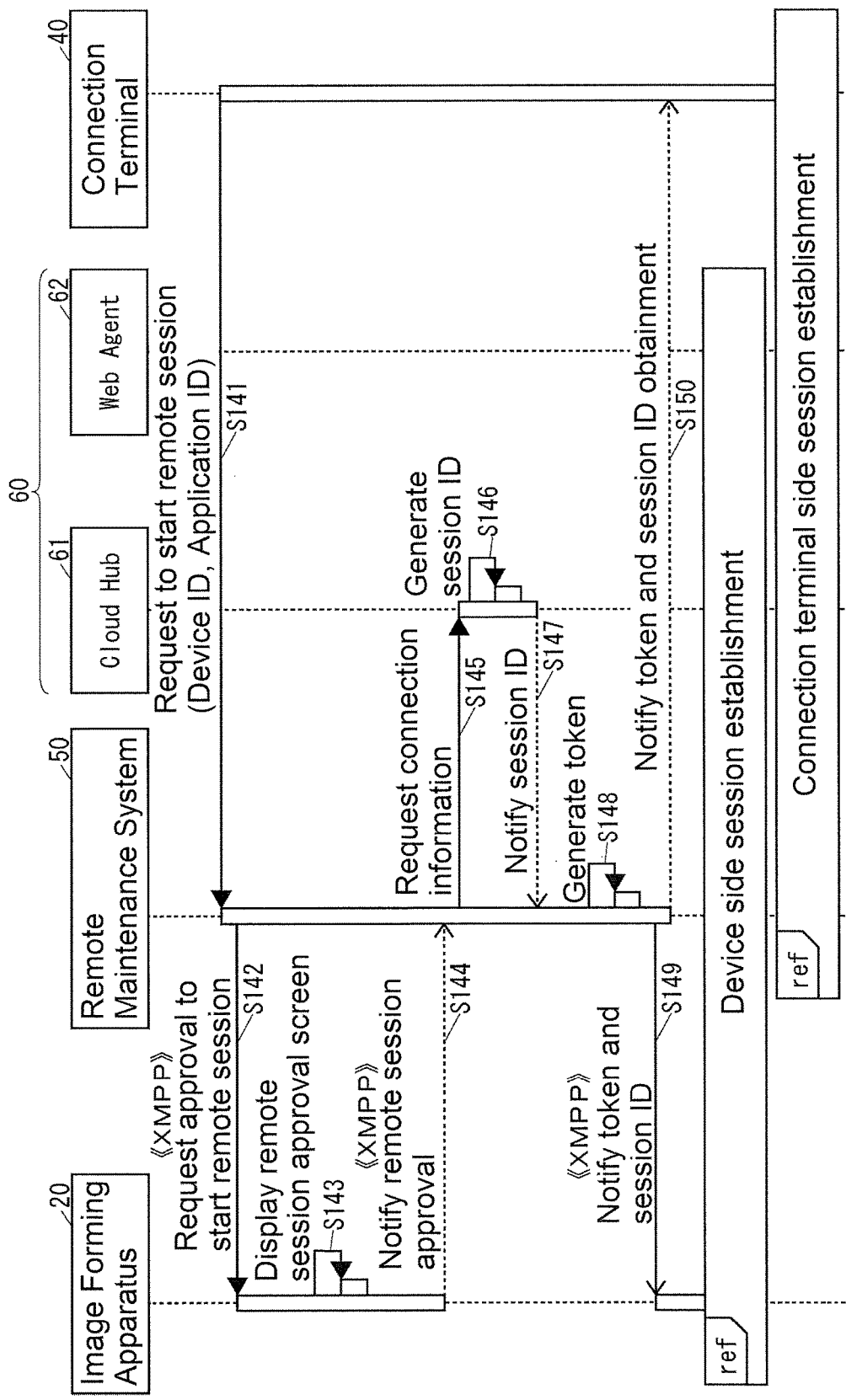
FIG. 8 illustrates an operation of the remote communication system according to the one embodiment when a remote session is started.
Figure 9:
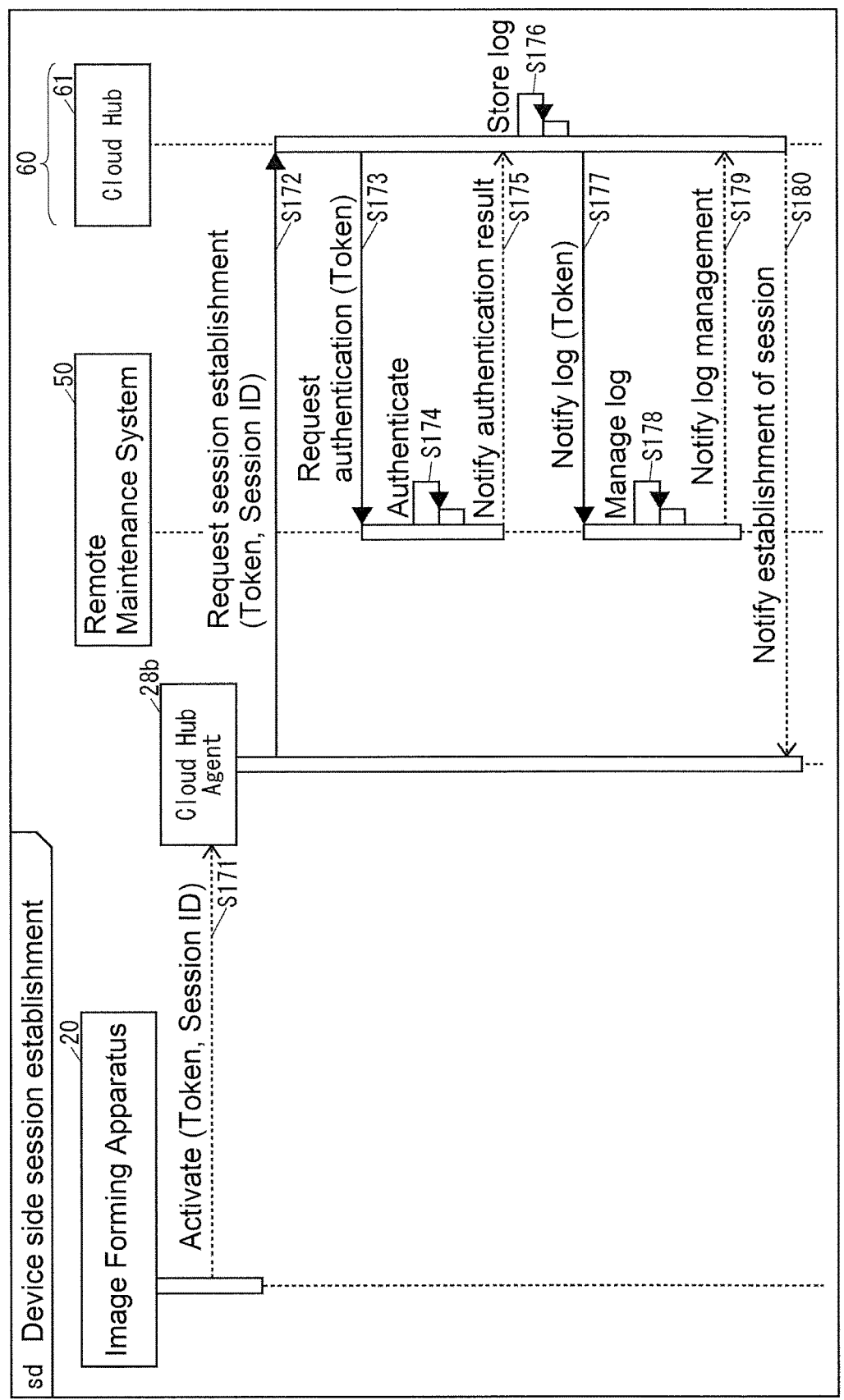
FIG. 9 illustrates a sequence diagram of a device side session establishment illustrated in FIG. 8.
Figure 10:
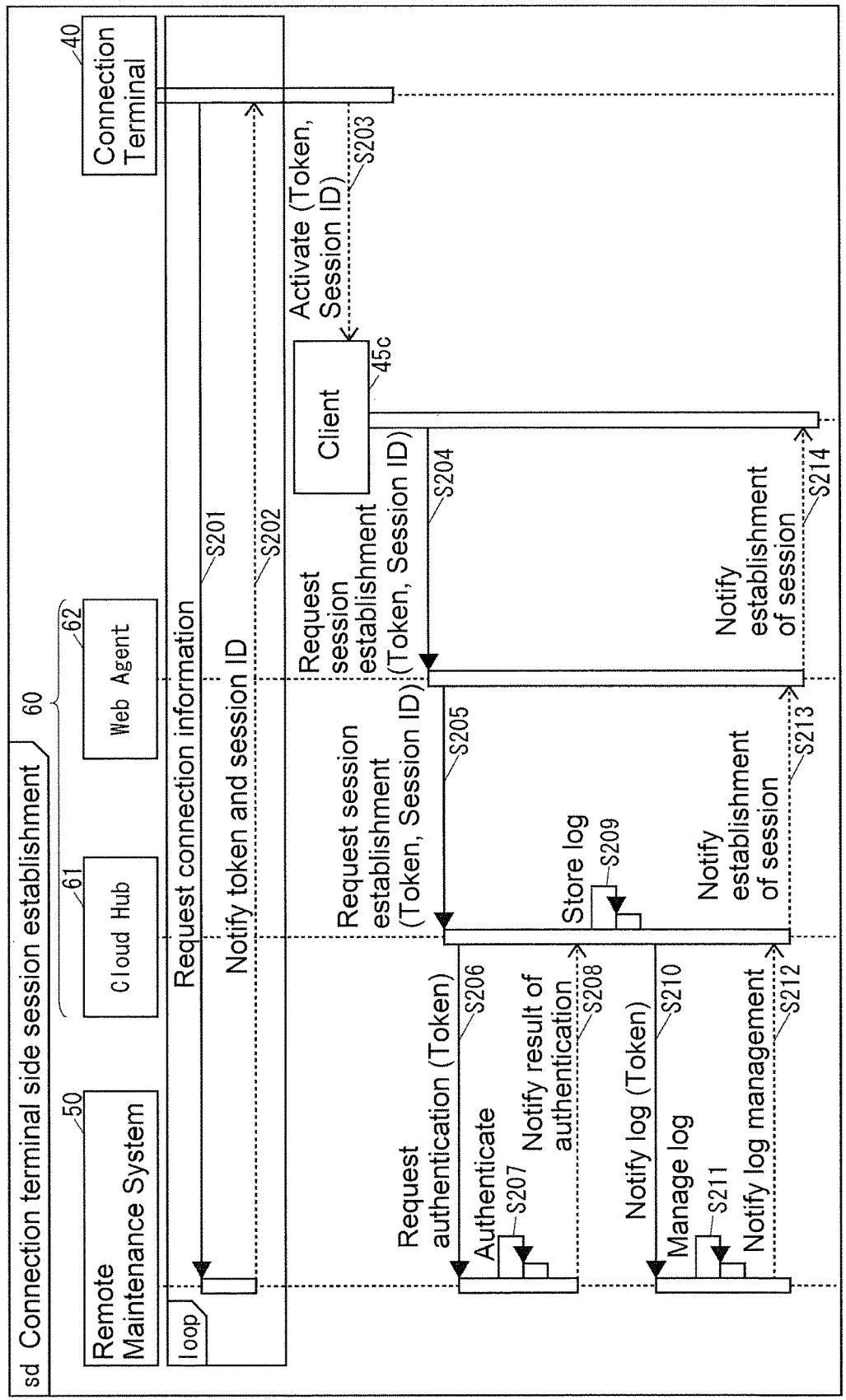
FIG. 10 illustrates a sequence diagram of a connection terminal side session establishment illustrated in FIG. 8.

FIG. 8 illustrates the operation of the remote communication system 10 when the remote session is started. FIG. 9 illustrates a sequence diagram of a device side session establishment illustrated in FIG. 8. FIG. 10 illustrates a sequence diagram of a connection terminal side session establishment illustrated in FIG. 8.

When being logged in to the remote maintenance system 50, the user of the connection terminal 40 can designate a specific client (hereinafter described as the client 45c in the description of the operation illustrated in FIGS. 8 to 10) and instruct to start the remote session with a specific image forming apparatus (hereinafter described as the image forming apparatus 20 in the description of the operation illustrated in FIGS. 8 to 10) via the operation unit 41. As illustrated in FIGS. 8 to 10, when accepting the instruction to start the remote session, the remote session control unit 45d of the connection terminal 40 notifies the remote maintenance system 50 of the device ID of the image forming apparatus 20 instructed via the operation unit 41 and an application ID of the client 45c instructed via the operation unit 41 to request the remote maintenance system 50 to start the remote session (Step S141).

It is preferred that the user of the connection terminal 40 separately informs a user of the image forming apparatus 20 of the fact that starting the remote session with the image forming apparatus 20 is desired by means of, for example, a telephone call before instructing to start the remote session with the image forming apparatus 20 via the operation unit 41 when the user of the connection terminal 40 instructs to start the remote session with the image forming apparatus 20 via the operation unit 41.

When accepting the request of Step S141, the session management unit 53 of the remote maintenance system 50 notifies the image forming apparatus 20 specified by the device ID notified at Step S141 of the application ID notified at Step S141 to request an approval to start the remote session by the XMPP (Step S142).

When receiving the request of Step S142, the server application 28a specified by the application ID notified at Step S142 among the server applications of the image forming apparatus 20 displays a remote session approval screen 70 (see FIG. 11) that accepts the instruction whether to approve the start of the remote session on the display 22 (Step S143).

Figure 11:
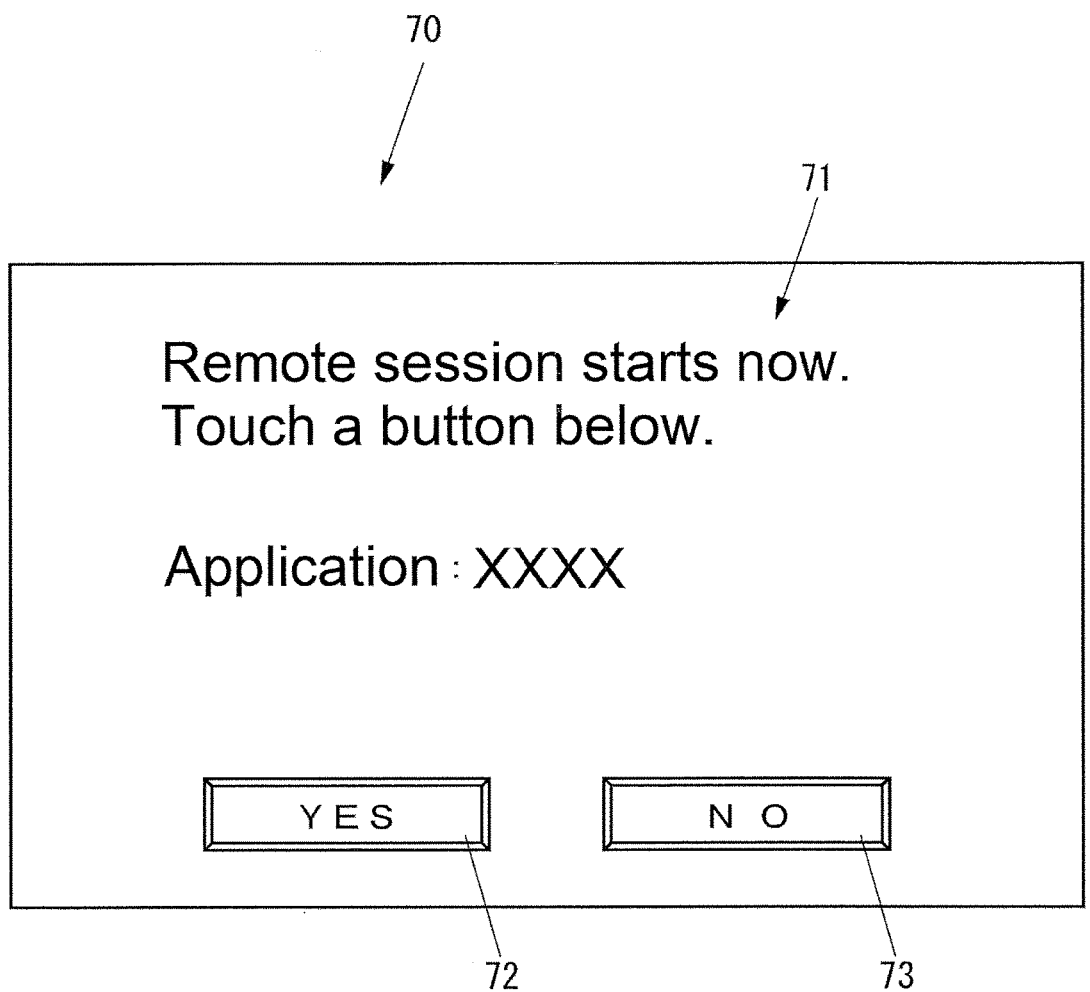
FIG. 11 illustrates an exemplary remote session approval screen displayed in the operation illustrated in FIG. 8.

FIG. 11 illustrates an example of the remote session approval screen 70.

The remote session approval screen 70 illustrated in FIG. 11 includes a message 71, a YES button 72, and a NO button 73. The message 71 queries whether the remote session is approved or not. The YES button 72 is for accepting an instruction to approve starting the remote session. The NO button 73 is for accepting an instruction not to approve starting the remote session. The user of the image forming apparatus 20 can press any one of the YES button 72 and the NO button 73 via the operation unit 21.

As illustrated in FIGS. 8 to 10, when the YES button 72 is pressed via the operation unit 21, the server application 28a notifies the remote maintenance system 50 by the XMPP of the fact that the remote session is approved (Step S144).

Although the illustration is omitted, when the NO button 73 is pressed with respect to the remote session approval screen 70 displayed on the display 22 via the operation unit 21 at Step S143, the remote communication system 10 operates as follows. First, the server application 28a of the image forming apparatus 20 notifies the remote maintenance system 50 by the XMPP of the fact that the remote session has failed to be approved. Next, the session management unit 53 of the remote maintenance system 50 notifies the connection terminal 40 of the fact that the remote session has failed to be approved. Then, the remote session control unit 45d of the connection terminal 40 displays the fact that the remote session has failed to be approved on the display 42.

When receiving the notification of Step S144, the session management unit 53 of the remote maintenance system 50 requests connection information from the session relay system 60 by an Application Program Interface (API) (Step S145).

When receiving the request of Step S145, the Cloud Hub 61 of the session relay system 60 generates a session ID for the session relay system 60 to identify the communication made by this remote session (Step S146), and notifies the remote maintenance system 50 of the generated session ID as the connection information using the API (Step S147). As the session ID, random identification information is employed. The random identification information includes, for example, a random number sequence generated by a hash algorithm, such as a Hash-based Message Authentication Code (HMAC), which is BASE64 encoded so as to be handled on a Hypertext Transfer Protocol (HTTP).

When the session ID is notified at Step S147, the session management unit 53 of the remote maintenance system 50 generates a token for the remote maintenance system 50 to recognize a valid duration of the remote session (Step S148), and notifies the image forming apparatus 20 of the generated token and the session ID notified at Step S147 by the XMPP (Step S149).

Next, the session management unit 53 notifies the connection terminal 40 of the fact that the token and the session ID are obtained (Step S150).

When the token and the session ID are notified at Step S149, the server application 28a of the image forming apparatus 20 activates the Cloud Hub Agent 28b to which the token and the session ID notified at Step S149 are set (Step S171).

Next, the Cloud Hub Agent 28b notifies the session relay system 60 of the set token and session ID to request the session relay system 60 to establish the session (Step S172).

When receiving the request of Step S172, the Cloud Hub 61 associated with the session ID notified at Step S172 among the Cloud Hubs of the session relay system 60 requests the remote maintenance system 50 to execute an authentication by the token notified at Step S172, using the API (Step S173). Accordingly, the session management unit 53 of the remote maintenance system 50 executes the authentication requested at Step S173 (Step S174), and notifies the session relay system 60 of a result of the authentication using the API (Step S175).

When a successful authentication is notified at Step S175, the Cloud Hub 61 of the session relay system 60 stores a log indicating the start of the session with the image forming apparatus 20 in the session management database 64 (Step S176), and notifies the remote maintenance system 50 of the log stored at Step S176 together with the token, using the API (Step S177). Accordingly, the session management unit 53 of the remote maintenance system 50 manages the log notified at Step S177 as a log of the remote session identified by the token notified at Step S177 (Step S178), and replies the fact that this log is managed to the session relay system 60, using the API (Step S179).

When the successful authentication is notified at Step S175, the Cloud Hub 61 of the session relay system 60 notifies the image forming apparatus 20 of the fact that the session with the image forming apparatus 20 is established (Step S180). That is, an HTTP-based WebSocket connection is established between the image forming apparatus 20 and the session relay system 60.

After the process at Step S141, the remote session control unit 45d of the connection terminal 40 requests the connection information from the remote maintenance system 50 by polling until obtaining the connection information from the remote maintenance system 50 (Step S201).

When the token is already generated at Step S148 when the session management unit 53 of the remote maintenance system 50 receives the request of Step S201, the session management unit 53 of the remote maintenance system 50 notifies the connection terminal 40 of this token and the session ID notified from the session relay system 60 at Step S147 as the connection information (Step S202).

When the token and the session ID are notified at Step S202, the remote session control unit 45d of the connection terminal 40 activates the client 45c to which the token and the session ID notified at Step S202 are set (Step S203).

Next, the client 45c notifies the session relay system 60 of the set token and session ID to request the session relay system 60 to establish the session (Step S204).

When receiving the request of Step S204, the Web Agent 62 associated with the session ID notified at Step S204 among the Web Agents of the session relay system 60 notifies the Cloud Hub 61 of the token and the session ID notified at Step S204 to request the Cloud Hub 61 to establish the session (Step S205).

When receiving the request of Step S205, the Cloud Hub 61 of the session relay system 60 requests the remote maintenance system 50 to execute an authentication by the token notified at Step S205, using the API (Step S206). Accordingly, the session management unit 53 of the remote maintenance system 50 executes the authentication requested at Step S206 (Step S207), and notifies the session relay system 60 of a result of the authentication using the API (Step S208).

When a successful authentication is notified at Step S208, the Cloud Hub 61 of the session relay system 60 stores a log indicating the start of the session with the connection terminal 40 in the session management database 64 (Step S209), and notifies the remote maintenance system 50 of the log stored at Step S209 together with the token, using the API (Step S210). Accordingly, the session management unit 53 of the remote maintenance system 50 manages the log notified at Step S210 as a log of the remote session identified by the token notified at Step S210 (Step S211), and replies the fact that this log is managed to the session relay system 60, using the API (Step S212).

When the successful authentication is notified at Step S208, the Cloud Hub 61 of the session relay system 60 notifies the Web Agent 62 of the fact that the session with the connection terminal 40 is established (Step S213). Accordingly, the Web Agent 62 notifies the connection terminal 40 of the fact that the session with the connection terminal 40 is established (Step S214). That is, an HTTP-based Web-Socket connection is established between the connection terminal 40 and the session relay system 60.

The session relay system 60 associates the WebSocket connection established with the image forming apparatus 20 by the operation illustrated in FIGS. 8 to 10 with the WebSocket connection established with the connection terminal 40 by the operation illustrated in FIGS. 8 to 10 using the session ID. Accordingly, the remote session is established by the operation illustrated in FIGS. 8 to 10.

The following describes an operation of the remote communication system 10 when the image forming apparatus 20 operates corresponding to the request from the connection terminal 40 via the remote session.

Figure 12:
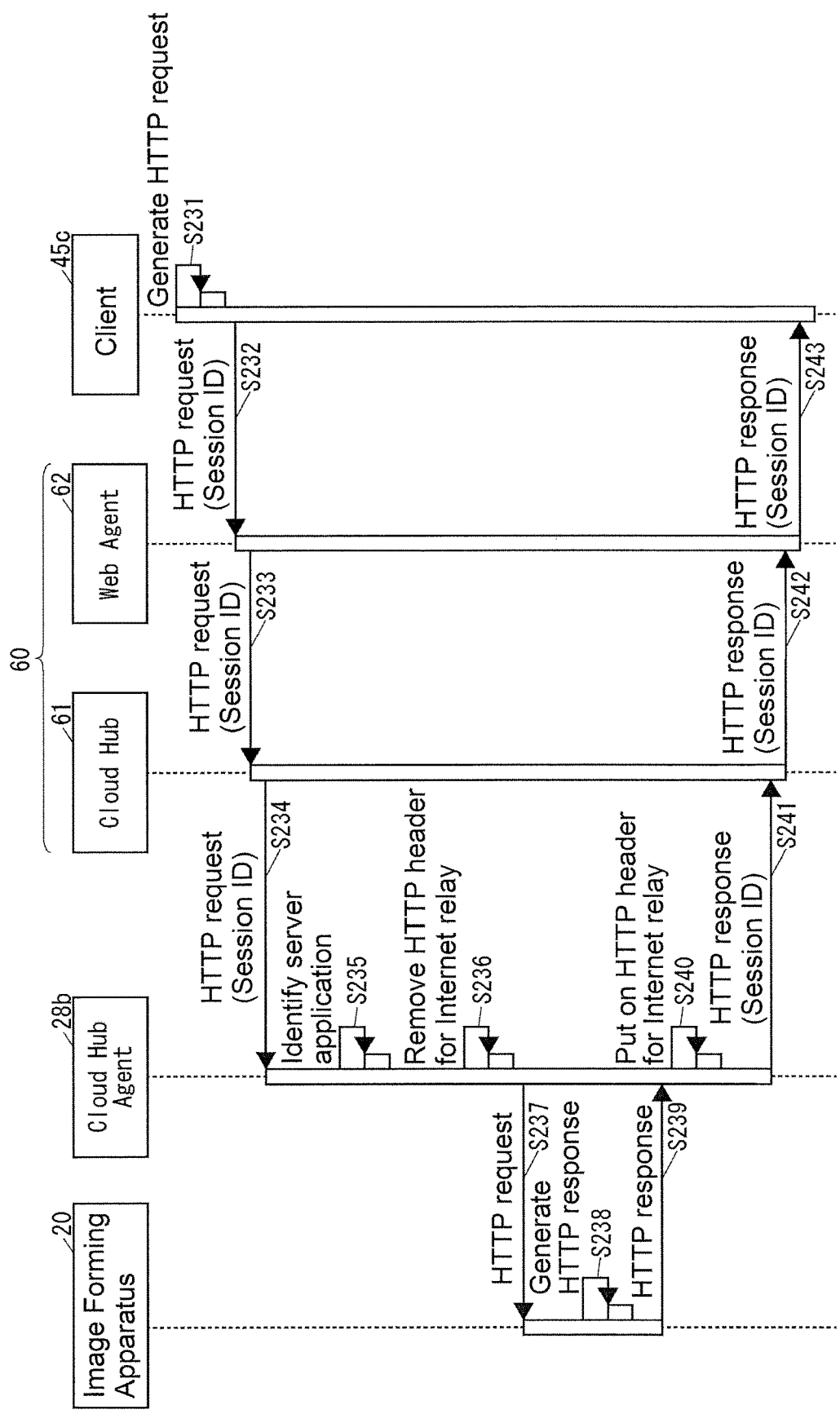
FIG. 12 illustrates an operation of the remote communication system according to the one embodiment when the image forming apparatus operates corresponding to a request from the connection terminal via the remote session.

FIG. 12 illustrates a sequence diagram of the operation of the remote communication system 10 when the image forming apparatus 20 operates corresponding to the request from the connection terminal 40 via the remote session.

When the remote session is established by the operation illustrated in FIGS. 8 to 10, the user of the connection terminal 40 can instruct a request toward the image forming apparatus 20 via the operation unit 41. When accepting the instruction to request toward the image forming apparatus 20, the client 45*c* of the connection terminal 40 generates an HTTP request for notifying the request instructed via the operation unit 41 as illustrated in FIG. 12 (Step S231).

Here, a structure of the HTTP request generated at Step S232 will be described.

Figure 13A:
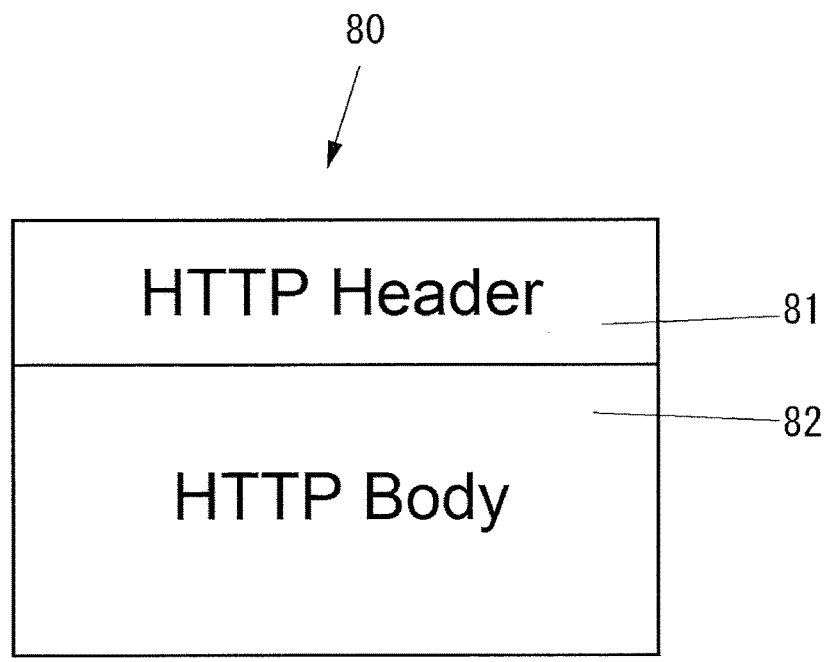
FIG. 13A illustrates HTTP data processed by a server application in the operation illustrated in FIG. 12.
Figure 13B:
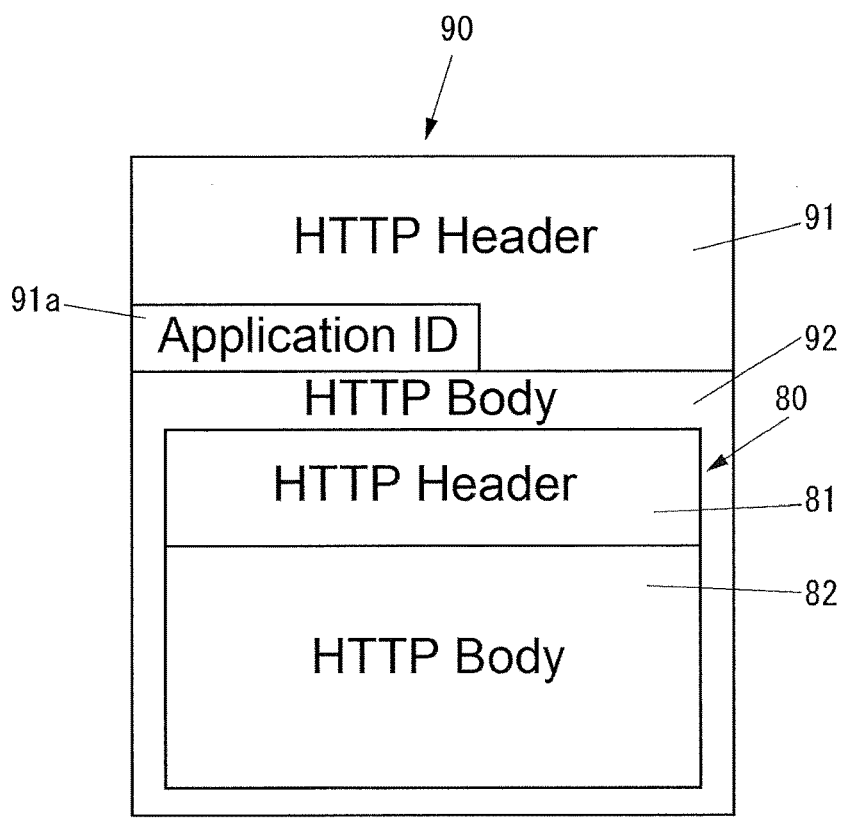
FIG. 13B illustrates HTTP data for relaying the HTTP data illustrated in FIG. 13A on the Internet.

FIG. 13A illustrates HTTP data 80 processed by the server application 28*a*. FIG. 13B illustrates HTTP data 90 for relaying the HTTP data 80 illustrated in FIG. 13A on the Internet.

As illustrated in FIGS. 13A and 13B, the HTTP data 80 includes an HTTP header 81 and an HTTP body 82. The HTTP data 90 includes an HTTP header 91 for relaying on the Internet and the HTTP data 80 as an HTTP body 92. The HTTP header 91 includes an application ID 91*a* for identifying the server application 28*a*.

The client 45*c* generates HTTP data having a structure similar to that of the HTTP data 90 illustrated in FIG. 13B as the HTTP request for notifying the request instructed via the operation unit 41. Here, the session ID is stored in a position corresponding to the HTTP header 91.

As illustrated in FIG. 12, the client 45*c* of the connection terminal 40 transmits the HTTP request generated at Step S231 to the session relay system 60 by the WebSocket connection (Step S232).

When the HTTP request is transmitted at Step S232, the Web Agent 62 associated with the session ID included in the HTTP request transmitted at Step S232 among the Web Agents of the session relay system 60 passes this HTTP request to the Cloud Hub 61 (Step S233). Accordingly, the Cloud Hub 61 transmits this HTTP request to the image forming apparatus 20 by the WebSocket connection corresponding to the session ID included in this HTTP request (Step S234).

When the HTTP request is transmitted at Step S234, the Cloud Hub Agent 28*b* of the image forming apparatus 20 identifies the server application 28*a* corresponding to the application ID included in this HTTP request (Step S235).

Next, the Cloud Hub Agent 28*b* generates an HTTP request that is made by removing the HTTP header for relaying on the Internet from the HTTP request transmitted at Step S234 (Step S236). Here, the HTTP request generated at Step S236 is HTTP data having a structure similar to that of the HTTP data 80 illustrated in FIG. 13A.

Next, the Cloud Hub Agent 28*b* passes the HTTP request generated at Step S236 to the server application 28*a* identified at Step S235 (Step S237).

When the HTTP request is passed at Step S237, the server application 28*a* generates an HTTP response corresponding to this HTTP request (Step S238). Here, the HTTP response generated at Step S238 is HTTP data having a structure similar to that of the HTTP data 80 illustrated in FIG. 13A.

Next, the server application 28*a* passes the HTTP response generated at Step S238 to the Cloud Hub Agent 28*b* (Step S239).

When the HTTP response is passed at Step S239, the Cloud Hub Agent 28*b* generates an HTTP response that is made by putting on the HTTP header for relaying on the Internet to the HTTP response passed at Step S239 (Step S240). Here, the HTTP response generated at Step S240 is HTTP data having a structure similar to that of the HTTP data 90 illustrated in FIG. 13B. The session ID is stored in a position corresponding to the HTTP header 91.

The Cloud Hub Agent 28*b* transmits the HTTP response generated at Step S240 to the session relay system 60 by the WebSocket connection (Step S241).

When the HTTP response is transmitted at Step S241, the Cloud Hub 61 associated with the session ID included in the HTTP response transmitted at Step S241 among the Cloud Hubs in the session relay system 60 passes this HTTP response to the Web Agent 62 (Step S242). Accordingly, the Web Agent 62 transmits this HTTP response to the connection terminal 40 by the WebSocket connection corresponding to the session ID included in this HTTP response (Step S243).

Accordingly, the client 45*c* of the connection terminal 40 can receive the HTTP response transmitted at Step S243.

Next, an operation of the remote communication system 10 when the remote session is terminated will be described.

Figure 14:
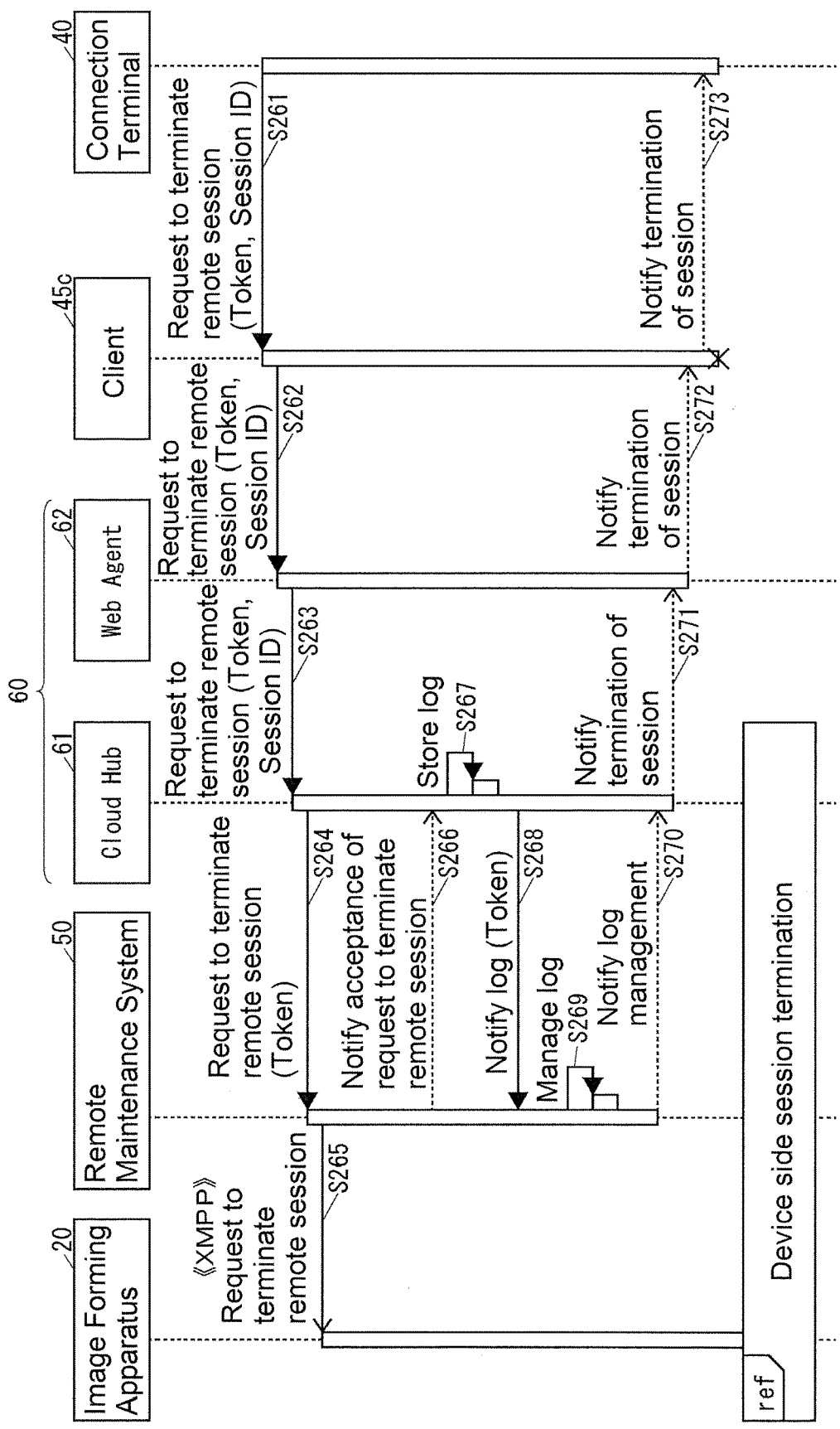
FIG. 14 illustrates an operation of the remote communication system according to the one embodiment when the remote session is terminated.
Figure 15:
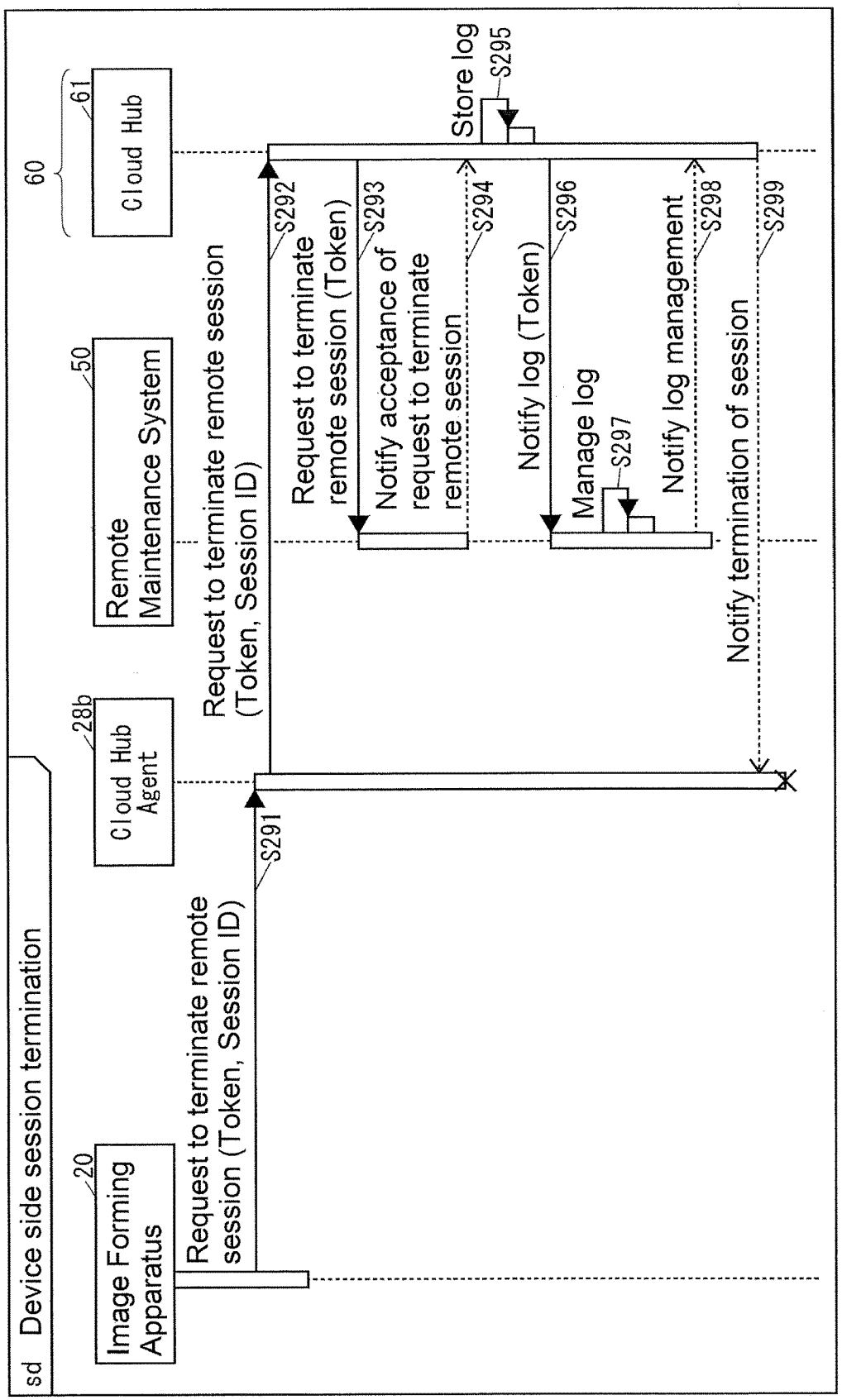
FIG. 15 illustrates a sequence diagram of a device side session termination illustrated in FIG. 14.

FIG. 14 illustrates the operation of the remote communication system 10 when the remote session is terminated. FIG. 15 illustrates a sequence diagram of a device side session termination illustrated in FIG. 14.

The user of the connection terminal 40 can instruct to terminate the remote session with a specific server application (hereinafter described as the server application 28*a* in the description of the operation illustrated in FIGS. 14 and 15) of a specific image forming apparatus (hereinafter described as the image forming apparatus 20 in the description of the operation illustrated in FIGS. 14 and 15) via the operation unit 41. When accepting the instruction to terminate the remote session, the remote session control unit 45*d* of the connection terminal 40 notifies the client 45*c* of the token and the session ID of the remote session instructed via the operation unit 41 as illustrated in FIGS. 14 and 15 to request the client 45*c* to terminate the remote session (Step S261). Accordingly, the client 45*c* requests the session relay system 60 to terminate the remote session requested at Step S261 by the WebSocket connection (Step S262).

When the termination of the remote session is requested at Step S262, the Web Agent 62 associated with a session ID included in the request at Step S262 among the Web Agents of the session relay system 60 passes this request to the Cloud Hub 61 (Step S263). Accordingly, the Cloud Hub 61 requests the remote maintenance system 50 to terminate the remote session identified by the token included in this request, using the API (Step S264).

When receiving the request of Step S264, the session management unit 53 of the remote maintenance system 50 requests the image forming apparatus 20 as a target of the remote session, which is a target of the request at Step S264, to terminate this remote session by the XMPP (Step S265).

Next, the session management unit 53 notifies the fact that the request to terminate the remote session is accepted to the session relay system 60, using the API (Step S266).

When the acceptance of the request to terminate the remote session is notified at Step S266, the Cloud Hub 61 of the session relay system 60 stores a log indicating the termination of the session with the connection terminal 40 in the session management database 64 (Step S267), and notifies the remote maintenance system 50 of the log stored at Step S267 together with the token, using the API (Step S268). Accordingly, the session management unit 53 of the remote maintenance system 50 manages the log notified at Step S268 as a log of the remote session identified by the token notified at Step S268 (Step S269), and replies the fact that this log is managed to the session relay system 60, using the API (Step S270).

When receiving the reply at Step S270, the Cloud Hub 61 of the session relay system 60 notifies the Web Agent 62 of the termination of the WebSocket connection between the connection terminal 40 and the session relay system 60 (Step S271). Accordingly, the Web Agent 62 notifies the connection terminal 40 of the termination of the WebSocket connection between the connection terminal 40 and the session relay system 60 (Step S272).

When receiving the notification at Step S272, the client 45c of the connection terminal 40 notifies the remote session control unit 45d of the termination of the WebSocket connection between the connection terminal 40 and the session relay system 60 (Step S273), and terminates its operation.

Accordingly, the remote session control unit 45d can, for example, display the fact that the WebSocket connection between the connection terminal 40 and the session relay system 60 is terminated on the display 42.

When receiving the request at Step S265, the server application 28a as the target of the remote session, which is the target of the request received at Step S265, among the server applications of the image forming apparatus 20 notifies the Cloud Hub Agent 28b of the token and the session ID of this remote session to request the Cloud Hub Agent 28b to terminate the remote session (Step S291). Accordingly, the Cloud Hub Agent 28b requests the session relay system 60 to terminate the remote session requested at Step S291 by the WebSocket connection (Step S292).

When receiving the request of Step S292, the Cloud Hub 61 of the session relay system 60 requests the remote maintenance system 50 to terminate the remote session identified by the token included in this request, using the API (Step S293).

When receiving the request of Step S293, the session management unit 53 of the remote maintenance system 50 notifies the session relay system 60 of the fact that the request to terminate the remote session is accepted, using the API (Step S294).

When the acceptance of the request to terminate the remote session is notified at Step S294, the Cloud Hub 61 of the session relay system 60 stores a log indicating the termination of the session with the image forming apparatus 20 in the session management database 64 (Step S295), and notifies the remote maintenance system 50 of the log stored at Step S295 together with the token, using the API (Step S296). Accordingly, the session management unit 53 of the remote maintenance system 50 manages the log notified at Step S296 as a log of the remote session identified by the token notified at Step S296 (Step S297), and replies the fact that this log is managed to the session relay system 60, using the API (Step S298).

When receiving the reply at Step S298, the Cloud Hub 61 of the session relay system 60 notifies the image forming apparatus 20 of the termination of the WebSocket connection between the image forming apparatus 20 and the session relay system 60 (Step S299).

When receiving the notification at Step S299, the Cloud Hub Agent 28b of the image forming apparatus 20 terminates its operation.

When the session management unit 53 of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 53 of the remote maintenance system 50 determines that the remote session between the image forming apparatus 20 and the connection terminal 40 via the session relay system 60 is terminated. When the session management unit 53 determines that the remote session between the image forming apparatus 20 and the connection terminal 40 via the session relay system 60 is not terminated, the session management unit 53 does not permit to establish a new remote session between the image forming apparatus 20 and the connection terminal 40 via the session relay system 60.

The following describes an operation of the remote communication system 10 when a test for a communication state (hereinafter referred to as a "session communication state test") via the remote session is executed.

Figure 16:
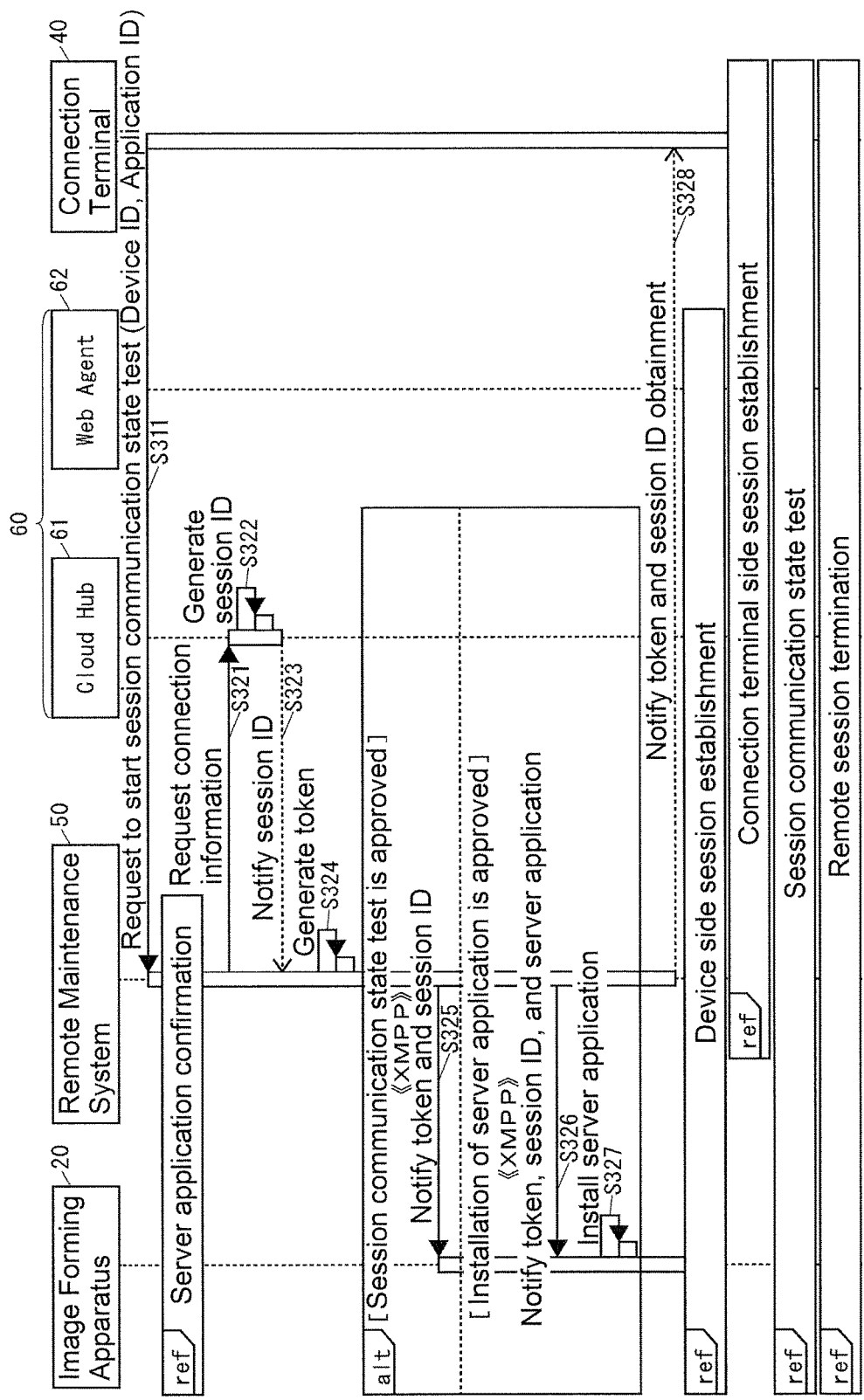
FIG. 16 illustrates an operation of the remote communication system according to the one embodiment when a test for a communication state via the remote session is executed.
Figure 17:
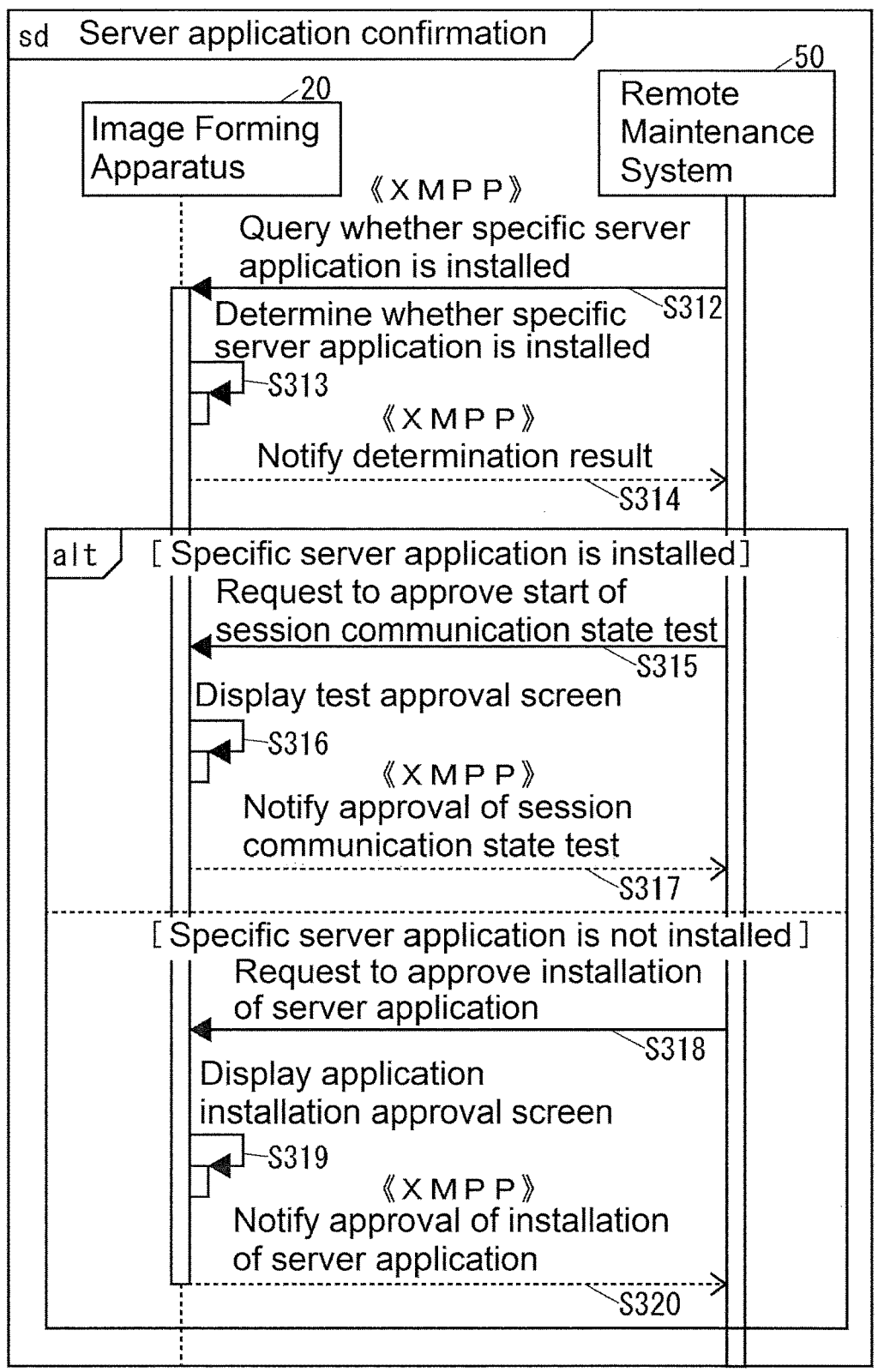
FIG. 17 illustrates a sequence diagram of a server application confirmation illustrated in FIG. 16.
Figure 18:
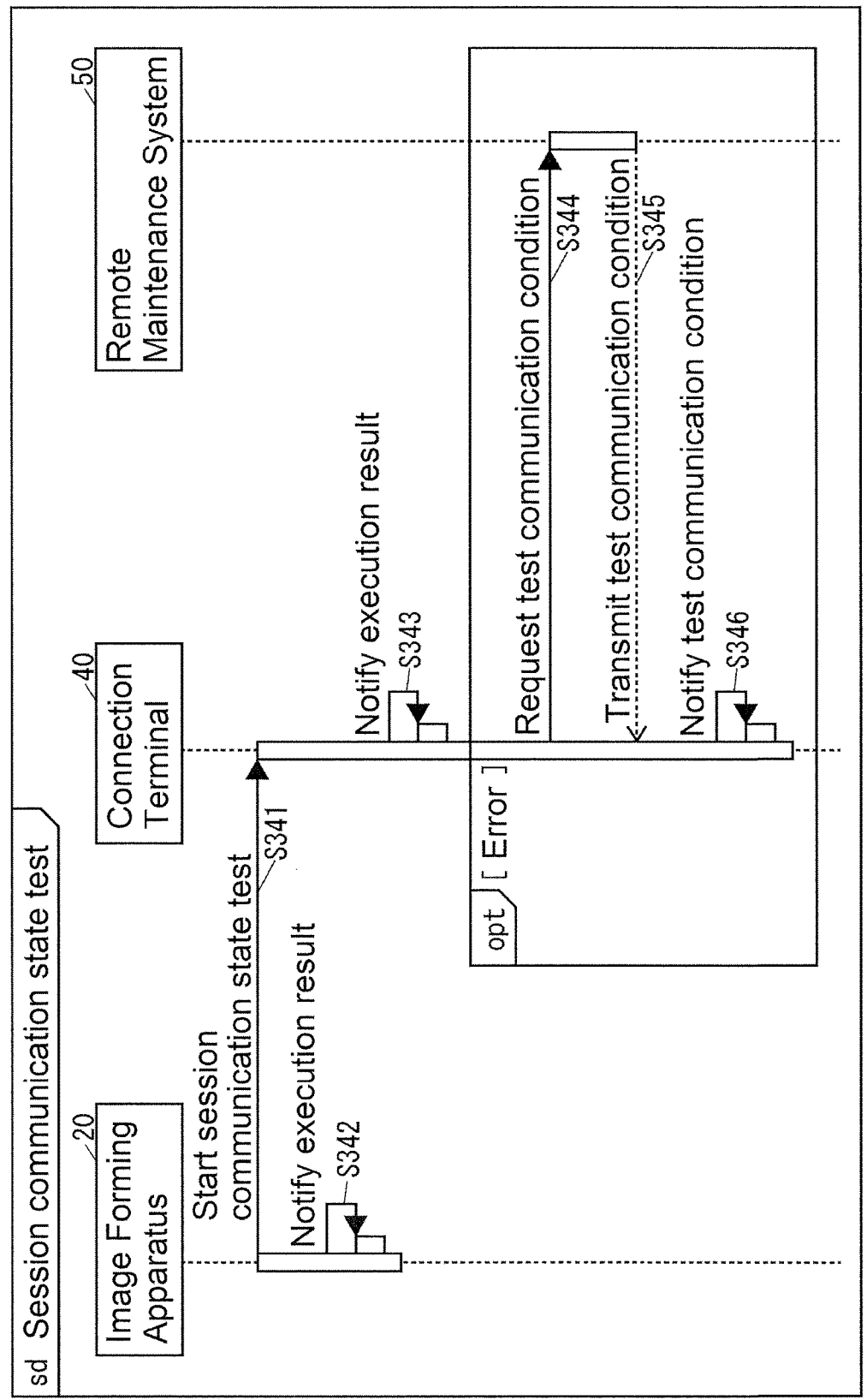
FIG. 18 illustrates a sequence diagram of a session communication state test illustrated in FIG. 16.
Figure 19:
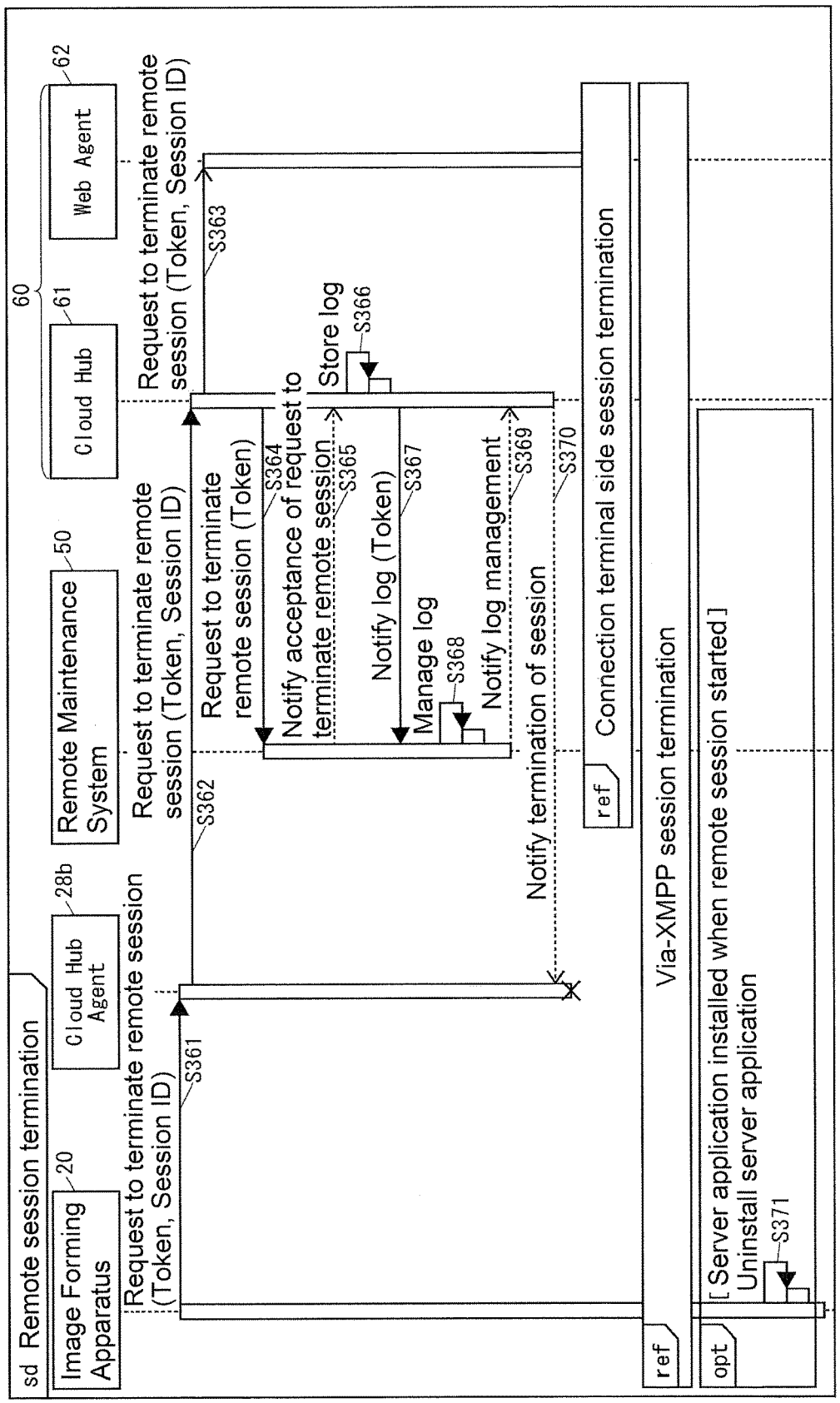
FIG. 19 illustrates a sequence diagram of a remote session termination illustrated in FIG. 16.
Figure 20:
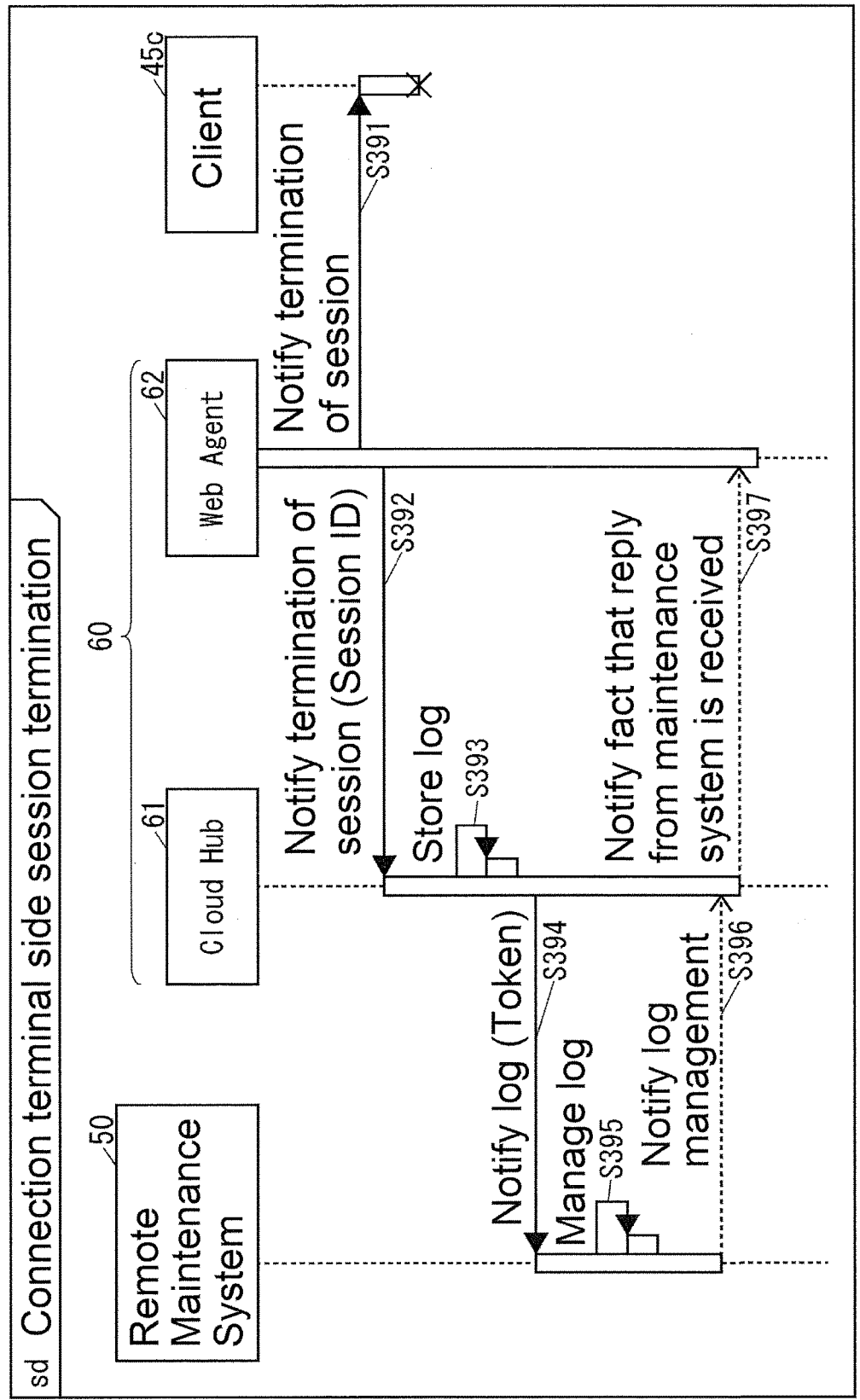
FIG. 20 illustrates a sequence diagram of a connection terminal side session termination illustrated in FIG. 19.
Figure 21:
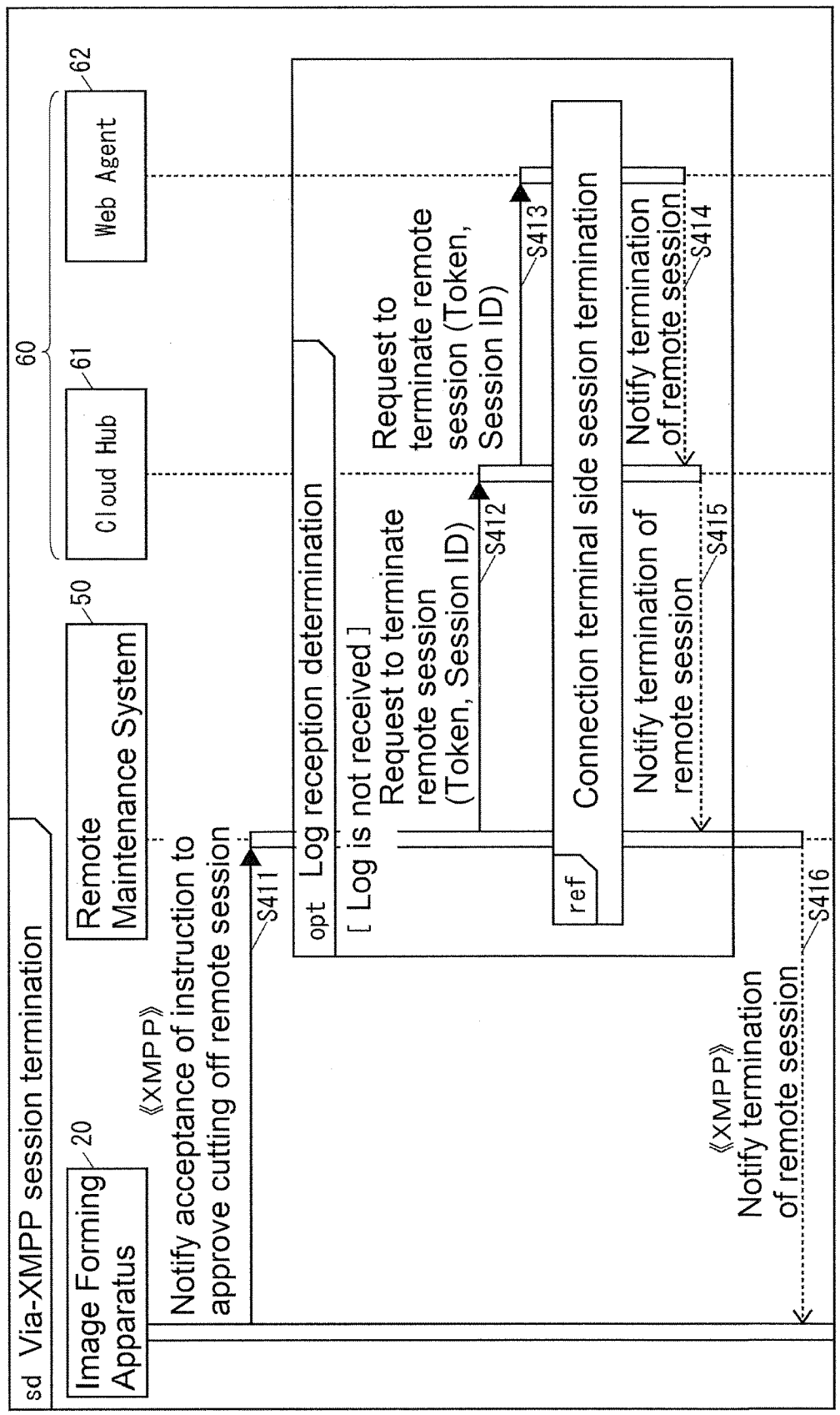
FIG. 21 illustrates a sequence diagram of a via-XMPP session termination illustrated in FIG. 19.

FIG. 16 illustrates the operation of the remote communication system 10 when the session communication state test is executed. FIG. 17 illustrates a sequence diagram of a server application confirmation illustrated in FIG. 16. FIG. 18 illustrates a sequence diagram of the session communication state test illustrated in FIG. 16. FIG. 19 illustrates a sequence diagram of a remote session termination illustrated in FIG. 16. FIG. 20 illustrates a sequence diagram of a connection terminal side session termination illustrated in FIG. 19. FIG. 21 illustrates a sequence diagram of a via-XMPP session termination illustrated in FIG. 19.

When being logged in to the remote maintenance system 50, the user of the connection terminal 40 can designate a client (hereinafter described as the client 45c in the description of the operation illustrated in FIGS. 16 to 21) for executing the session communication state test and instruct a specific image forming apparatus (hereinafter described as the image forming apparatus 20 in the description of the operation illustrated in FIGS. 16 to 21) to execute the session communication state test via the remote session. This session communication state test is instructed via the operation unit 41. When accepting the instruction to execute the session communication state test, the remote session control unit 45d of the connection terminal 40 notifies the remote maintenance system 50 of the device ID of the image forming apparatus 20 instructed via the operation unit 41 and the application ID of the client 45c instructed via the operation unit 41 as illustrated in FIGS. 16 to 21 to request the remote maintenance system 50 to start the session communication state test (Step S311).

It is preferred that the user of the connection terminal 40 separately informs a user of the image forming apparatus 20 of the fact that execution of the session communication state test with the image forming apparatus 20 is desired by means of, for example, a telephone call before instructing to execute the session communication state test with the image forming apparatus 20 via the operation unit 41 when the user of the connection terminal 40 instructs to execute the session communication state test with the image forming apparatus 20 via the operation unit 41.

When accepting the request at Step S311, the session management unit 53 of the remote maintenance system 50 notifies the image forming apparatus 20 specified by the device ID notified at Step S311 of the application ID notified at Step S311 to query whether the server application specified by this application ID is installed in the image forming apparatus 20 or not by the XMPP (Step S312).

When receiving the query at Step S312, a remote session control unit 28c of the image forming apparatus 20 determines whether the server application specified by the application ID notified at Step S312 among the server applications of the image forming apparatus 20 is installed or not (Step S313), and notifies the determination result by the XMPP (Step S314).

When receiving the notification of Step S314 that indicates that the target server application is installed, the session management unit 53 of the remote maintenance system 50 notifies the application ID notified at Step S311 to request the image forming apparatus 20 to approve the start of the session communication state test by the XMPP (Step S315).

When receiving the request of Step S315, the remote session control unit 28c of the image forming apparatus 20 displays a test approval screen 75 (see FIG. 22) that accepts the instruction whether to approve the start of the session communication state test or not on the display 22 (Step S316).

Figure 22:
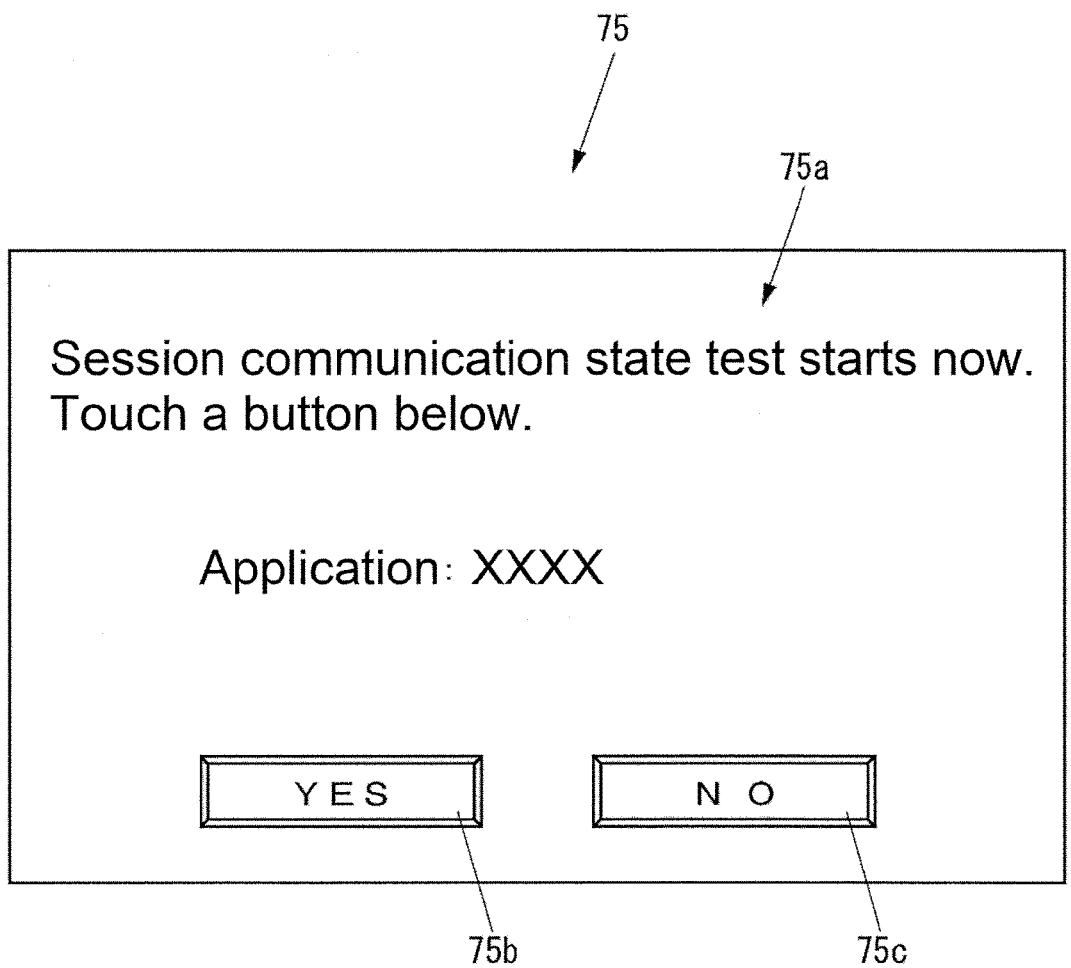
FIG. 22 illustrates an exemplary test approval screen displayed in the operation illustrated in FIG. 16.

FIG. 22 illustrates an example of the test approval screen 75.

The test approval screen 75 illustrated in FIG. 22 includes a message 75a, a YES button 75b, and a NO button 75c. The message 75a queries whether the start of the session communication state test is approved or not. The YES button 75b is for accepting an instruction to approve the start of the session communication state test. The NO button 75c is for accepting an instruction not to approve the start of the session communication state test. The user of the image forming apparatus 20 can press any one of the YES button 75b and the NO button 75c via the operation unit 21.

When the YES button 75b is pressed via the operation unit 21, the remote session control unit 28c notifies the remote maintenance system 50 of the fact that the session communication state test is approved by the XMPP as illustrated in FIGS. 16 to 21 (Step S317).

Although the illustration is omitted, when the NO button 75c is pressed with respect to the test approval screen 75 displayed on the display 22 via the operation unit 21 at Step S316, the remote communication system 10 operates as follows. First, the remote session control unit 28c of the image forming apparatus 20 notifies the remote maintenance system 50 by the XMPP of the fact that the session communication state test has failed to be approved. Next, the session management unit 53 of the remote maintenance system 50 notifies the connection terminal 40 of the fact that the session communication state test has failed to be approved. Then, the remote session control unit 45d of the connection terminal 40 displays the fact that the session communication state test has failed to be approved on the display 42.

When receiving the notification of Step S314 indicating that the target server application is not installed, the session management unit 53 of the remote maintenance system 50 notifies the application ID notified at Step S311 to request the image forming apparatus 20 to approve the installation of the server application specified by this application ID by the XMPP (Step S318).

When receiving the request of Step S318, the remote session control unit 28c of the image forming apparatus 20 displays an application installation approval screen 76 (see FIG. 23) that accepts the instruction whether the installation of the server application specified by the application ID notified at Step S318 is approved or not on the display 22 (Step S319).

Figure 23:
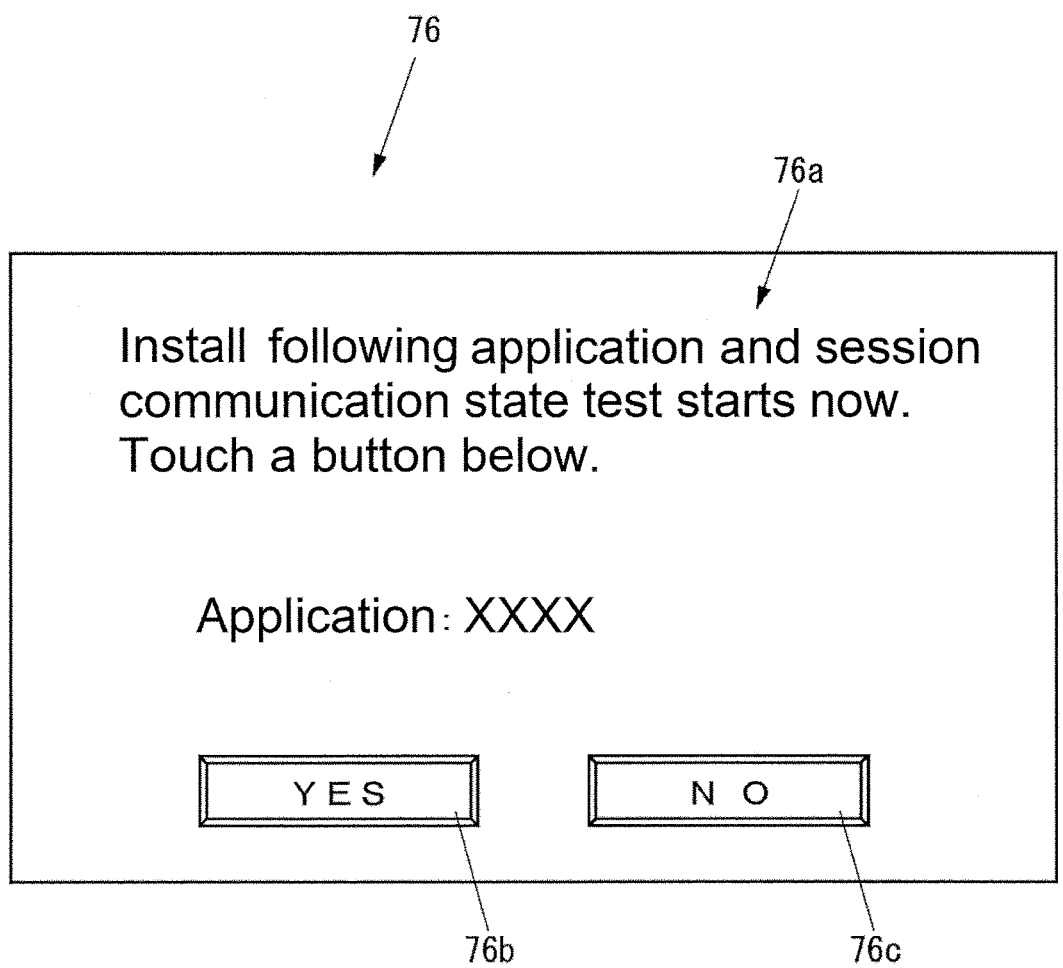
FIG. 23 illustrates an exemplary application installation approval screen displayed in the operation illustrated in FIG. 16.

FIG. 23 illustrates an example of the application installation approval screen 76.

The application installation approval screen 76 illustrated in FIG. 23 includes a message 76a, a YES button 76b, and a NO button 76c. The message 76a queries whether the installation of the server application for the remote session is approved or not. The YES button 76b is for accepting an instruction to approve the start of installing the server application. The NO button 76c is for accepting an instruction not to approve the start of installing the server application. The user of the image forming apparatus 20 can press any one of the YES button 76b and the NO button 76c via the operation unit 21.

When the YES button 76b is pressed via the operation unit 21, the remote session control unit 28c notifies the remote maintenance system 50 of the fact that the installation of the target server application is approved by the XMPP as illustrated in FIGS. 16 to 21 (Step S320).

Although the illustration is omitted, when the NO button 76c is pressed with respect to the application installation approval screen 76 displayed on the display 22 via the operation unit 21 at Step S319, the remote communication system 10 operates as follows. First, the remote session control unit 28c of the image forming apparatus 20 notifies the remote maintenance system 50 by the XMPP of the fact that the installation of the target server application has failed to be approved. Next, the session management unit 53 of the remote maintenance system 50 notifies the connection terminal 40 of the fact that the installation of the target server application has failed to be approved. Then, the remote session control unit 45d of the connection terminal 40 displays the fact that the installation of the target server application has failed to be approved on the display 42.

When receiving the notification of Steps S317 or S320, the session management unit 53 of the remote maintenance system 50 requests the connection information of the session relay system 60 by the Application Program Interface (API) (Step S321).

When receiving the request at Step S321, the Cloud Hub 61 of the session relay system 60 generates the session ID for identifying the communication by this remote session in the session relay system 60 (Step S322), and notifies the remote maintenance system 50 of the generated session ID as the connection information using the API (Step S323). As the session ID, random identification information is employed. The random identification information includes, for example, a random number sequence generated by a hash algorithm, such as a Hash-based Message Authentication Code (HMAC), which is BASE64 encoded so as to be handled on a Hypertext Transfer Protocol (HTTP).

When the session ID is notified at Step S323, the session management unit 53 of the remote maintenance system 50 generates a token for the remote maintenance system 50 to recognize a valid duration of the remote session (Step S324).

When the fact that the remote session is approved is notified at Step S317, the session management unit 53 notifies the image forming apparatus 20 of the token generated at Step S324 and the session ID notified at Step S323 by the XMPP after the process at Step S324 (Step S325).

When the fact that the installation of the target server application is approved is notified at Step S320, the session management unit 53 notifies the image forming apparatus 20 of the token generated at Step S324, the session ID notified at Step S323, and the target server application by the XMPP after the process at Step S324 (Step S326).

When receiving the server application transmitted at Step S326, the remote session control unit 28c of the image forming apparatus 20 installs this server application to the image forming apparatus 20 itself (Step S327).

Hereinafter, the server application specified by the application ID notified from the connection terminal 40 to the remote maintenance system 50 at Step S311 is described as the server application 28a.

After the process at Step S325 or S327, the session management unit 53 of the remote maintenance system 50 notifies the connection terminal 40 of the fact that the token and the session ID are obtained (Step S328).

When the token and the session ID are notified to the image forming apparatus 20 at Step S325 or S326, the remote communication system 10 executes an operation similar to the operation illustrated in FIG. 9. Accordingly, the HTTP-based WebSocket connection is established between the image forming apparatus 20 and the session relay system 60.

The remote communication system 10 executes an operation similar to the operation illustrated in FIG. 10 after the process at Step S311. Accordingly, the HTTP-based WebSocket connection is established between the connection terminal 40 and the session relay system 60.

Subsequently, the remote communication system 10 can execute the communication via the remote session between the image forming apparatus 20 and the connection terminal 40 relayed by the session relay system 60 similar to the operation illustrated in FIG. 12. Accordingly, the server application 28a of the image forming apparatus 20 starts the session communication state test via this remote session with the client 45c of the connection terminal 40 (Step S341). For example, the server application 28a of the image forming apparatus 20 and the client 45c of the connection terminal 40 alternately transmit information with one another for multiple times to confirm whether the multiple-time transmitting and receiving of the information is properly executed or not in a way such as, in the session communication state test, the server application 28a first transmits specific information to the client 45c, then the client 45c that has received the specific information from the server application 28a transmits the specific information to the server application 28a, and then the server application 28a that has received the specific information from the client 45c transmits the specific information to the client 45c and so forth via the remote session relayed by the session relay system 60.

The session management unit 53 of the remote maintenance system 50 obtains a communication condition (hereinafter referred to as a "test communication condition") of information for the session communication state test from the image forming apparatus 20 and the session relay system 60. Here, the test communication condition includes information, for example, when the information for the session communication state test is transmitted to the session relay system 60 from the image forming apparatus 20, when the information for the session communication state test transmitted from the image forming apparatus 20 is received by the session relay system 60, when the information for the session communication state test is transmitted to the connection terminal 40 from the session relay system 60, when the information for the session communication state test transmitted from the connection terminal 40 is received by the session relay system 60, when the information for the session communication state test is transmitted to the image forming apparatus 20 from the session relay system 60, and when the information for the session communication state test transmitted from the session relay system 60 is received by the image forming apparatus 20.

When the session communication state test started at Step S341 is normally terminated or when even after a predetermined period elapses from the start of the session communication state test started at Step S341, this session communication state test is not normally terminated, the server application 28a of the image forming apparatus 20 displays an execution result of the session communication state test started at Step S341 on the display 22 for notification (Step S342). Here, when this session communication state test is not normally terminated even after the predetermined period elapses from the start of the session communication state test started at Step S341, the server application 28a notifies about the fact that the execution result of the session communication state test started at Step S341 is an error at Step S342.

Similarly, when the session communication state test started at Step S341 is normally terminated or when this session communication state test is not normally terminated even after the predetermined period elapses from the start of the session communication state test started at Step S341, the client 45c of the connection terminal 40 notifies the execution result of the session communication state test started at Step S341 by displaying on the display 42 (Step S343). Here, when this session communication state test is not normally terminated even after the predetermined period is elapsed from the start of the session communication state test started at Step S341, the client 45c notifies the fact that the execution result of the session communication state test started at Step S341 is the error at Step S343.

When the execution result of the session communication state test notified at Step S343 is the error, the client 45c requests the test communication condition that the remote maintenance system 50 obtained from the image forming apparatus 20 and the session relay system 60 from the remote maintenance system 50 (Step S344). When receiving the request of Step S344, the session management unit 53 of the remote maintenance system 50 transmits the test communication condition requested at Step S344 to the connection terminal 40 (Step S345). Accordingly, the client 45c of the connection terminal 40 displays the test communication condition transmitted from the remote maintenance system 50 at Step S345 on the display 42 for notification (Step S346).

When the operation at Step S342 is terminated, the server application 28a of the image forming apparatus 20 notifies the Cloud Hub Agent 28b of the token and the session ID of the target remote session to request the Cloud Hub Agent 28b to terminate the remote session (Step S361). Accordingly, the Cloud Hub Agent 28b requests the session relay system 60 to terminate the remote session requested at Step S361 by the WebSocket connection (Step S362).

When receiving the request of Step S362, the Cloud Hub 61 of the session relay system 60 requests the Web Agent 62 to terminate the remote session requested at Step S362 (Step S363).

When receiving the request of Step S362, the Cloud Hub 61 of the session relay system 60 requests the remote maintenance system 50 to terminate the remote session identified by the token included in this request, using the API (Step S364).

When receiving the request of Step S364, the session management unit 53 of the remote maintenance system 50 notifies the session relay system 60 of the fact that the request to terminate the remote session is accepted, using the API (Step S365).

When an acceptance of the request to terminate the remote session is notified at Step S365, the Cloud Hub 61 of the session relay system 60 stores a log indicating the termination of the session with the image forming apparatus 20 in the session management database 64 (Step S366), and notifies the remote maintenance system 50 of the log stored at Step S366 together with the token, using the API (Step S367). Accordingly, the session management unit 53 of the remote maintenance system 50 manages the log notified at Step S367 as a log of the remote session identified by the token notified at Step S367 (Step S368), and replies the fact that this log is managed to the session relay system 60, using the API (Step S369).

When receiving the reply at Step S369, the Cloud Hub 61 of the session relay system 60 notifies the image forming apparatus 20 of the termination of the WebSocket connection between the image forming apparatus 20 and the session relay system 60 (Step S370).

When receiving the notification of Step S370, the Cloud Hub Agent 28b of the image forming apparatus 20 terminates its own operation.

When receiving the request of Step S363, the Web Agent 62 of the session relay system 60 notifies the connection terminal 40 of the termination of the WebSocket connection between the connection terminal 40 and the session relay system 60 (Step S391).

When receiving the notification of Step S391, the client 45c of the connection terminal 40 terminates its own operation.

After the process at Step S391, the Web Agent 62 of the session relay system 60 notifies the Cloud Hub 61 that the session with the connection terminal 40 is terminated (Step S392).

When the termination of the session with the connection terminal 40 is notified at Step S392, the Cloud Hub 61 of the session relay system 60 stores a log indicating that the session with the connection terminal 40 is terminated in the session management database 64 (Step S393), and notifies the remote maintenance system 50 of the log stored at Step S393 together with the token, using the API (Step S394). Accordingly, the session management unit 53 of the remote maintenance system 50 manages the log notified at Step S394 as a log of the remote session identified by the token notified at Step S394 (Step S395), and replies the fact that this log is managed to the session relay system 60, using the API (Step S396).

When receiving the reply at Step S396, the Cloud Hub 61 of the session relay system 60 notifies the Web Agent 62 of the fact that the reply from the remote maintenance system 50 is received (Step S397).

When the YES button 72 is pressed via the operation unit 21, the server application 28a of the image forming apparatus 20 notifies the remote maintenance system 50 of the fact that the instruction to approve cutting off the remote session is accepted by the XMPP (Step S411).

When the log notified at Step S394 is not yet received when receiving the notification at Step S411, the session management unit 53 of the remote maintenance system 50 notifies the session relay system 60 of the token and the session ID of the target remote session to request the session relay system 60 of the termination of the remote session (Step S412). Accordingly, the Cloud Hub 61 of the session relay system 60 requests the Web Agent 62 to terminate the remote session requested at Step S412 (Step S413).

The remote communication system 10 executes a process similar to the process at the above-described Steps S391 to S397 after the process at Step S413.

Next, the Web Agent 62 of the session relay system 60 notifies the Cloud Hub 61 of the termination of the remote session (Step S414). Accordingly, the Cloud Hub 61 of the session relay system 60 notifies the remote maintenance system 50 of the termination of the remote session (Step S415).

When receiving the notification of Step S415, the session management unit 53 of the remote maintenance system 50 notifies the image forming apparatus 20 of the termination of the remote session by the XMPP (Step S416).

When the log notified at Step S394 is already received when receiving the notification of Step S411, the session management unit 53 of the remote maintenance system 50 does not execute the process at the above-described Steps S412 to S415.

The reason why the processes at Steps S412 to S415 are executed when the log notified at Step S394 has not been yet received when the session management unit 53 receives the notification of Step S411 is as follows. The notification of the log from the Cloud Hub 61 of the session relay system 60 caused by the server application 28a of the image forming apparatus 20 requesting the Cloud Hub Agent 28b to terminate the remote session at Step S361 (Step S394) and the notification of the acceptance of the instruction to approve cutting off the remote session from the server application 28a of the image forming apparatus 20 via the XMPP (Step S411) are asynchronously executed; therefore it cannot be determined which one is executed first.

When the session management unit 53 of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 53 of the remote maintenance system 50 determines that the remote session between the image forming apparatus 20 and the connection terminal 40 via the session relay system 60 is terminated. When the session management unit 53 determines that the remote session between the image forming apparatus 20 and the connection terminal 40 via the session relay system 60 is not terminated, the session management unit 53 does not permit to establish a new remote session between the image forming apparatus 20 and the connection terminal 40 via the session relay system 60.

When the server application 28a is installed at Step S327, the control unit 28 of the image forming apparatus 20 causes the Cloud Hub Agent 28b to terminate and uninstalls the server application 28a after receiving the notification of Step S416 (Step S371).

As described above, in the remote communication system 10, the image forming apparatus 20 establishes the WebSocket connection, which uses the session ID, with the session relay system 60 (Steps S171 to S180), the connection terminal 40 establishes the WebSocket connection, which uses the session ID, with the session relay system 60 (Steps S201 to S214), and the session relay system 60 relays the remote session by associating the connection established with the connection terminal 40 with the connection established with the image forming apparatus 20 using the session ID (Steps S231 to S243). With this configuration, in the remote communication system 10, only the connection terminal 40 notified of the session ID from the remote maintenance system 50 among the connection terminals located outside the network to which the image forming apparatus 20 belongs establishes the remote session with the image forming apparatus 20 relayed by the session relay system 60, thereby ensuring an improved security when the image forming apparatus 20 is controlled from the connection terminal 40 located outside the network to which the image forming apparatus 20 belongs.

In the remote communication system 10, the session ID used by the WebSocket connection established between the image forming apparatus 20 and the session relay system 60 and the session ID used by the WebSocket connection established between the connection terminal 40 and the session relay system 60 are identical session IDs. With this configuration, it is not necessary for the remote communication system 10 to associate two mutually different session IDs in the session relay system 60, thereby ensuring a simplified process of the session ID in the session relay system 60. The session ID used by the WebSocket connection established between the image forming apparatus 20 and the session relay system 60 and the session ID used by the WebSocket connection established between the connection terminal 40 and the session relay system 60 may be mutually different as long as they are associated with one another in the session relay system 60.

In the remote communication system 10, at least one of the WebSocket connection established between the session relay system 60 and the connection terminal 40 and the WebSocket connection established between the session relay system 60 and the image forming apparatus 20 may be a connection with encrypted communication, such as a Secure Sockets Layer (SSL). With this configuration, the remote communication system 10 has at least a part of a path of the remote session between the connection terminal 40 and the image forming apparatus 20 relayed by the session relay system 60 encrypted, thereby reducing an occurrence of an invalid use, such as cracking, to the image forming apparatus 20.

In the remote communication system 10, the remote maintenance system 50 accepts the request (Step S141) to start the remote session from the connection terminal 40 when the user of the connection terminal 40 is logged in to the remote maintenance system 50. The remote maintenance system 50 does not execute the notification (Step S149) of the session ID to the image forming apparatus 20 and the notification (Step S202) of the session ID to the connection terminal 40 when the request to start the remote session is not accepted from the connection terminal 40. With this configuration, the remote communication system 10 has the remote session between the connection terminal 40 and the image forming apparatus 20 relayed by the session relay system 60 established only when the user of the connection terminal 40 can log in to the remote maintenance system 50, thereby ensuring the improved security of this remote session.

In the remote communication system 10, the remote maintenance system 50 does not execute the notification (Step S149) of the session ID to the image forming apparatus 20 and the notification (Step S202) of the session ID to the connection terminal 40 when the start of the remote session is not approved from the user of the image forming apparatus 20. With this configuration, the remote communication system 10 has the remote session between the connection terminal 40 and the image forming apparatus 20 relayed by the session relay system 60 established only when the start of the remote session is approved by the user of the image forming apparatus 20, thereby ensuring the improved security of this remote session. The remote maintenance system 50 may be configured not to execute any one of the notification of the session ID to the image forming apparatus 20 and the notification of the session ID to the connection terminal 40 when the start of the remote session is not approved by the user of the image forming apparatus 20.

In the remote communication system 10, the session relay system 60 changes the session ID (Step S146) every time the session ID is requested by the remote maintenance system 50 (Step S145). With this configuration, the remote communication system 10 has the session ID changed every time the remote session between the connection terminal 40 and the image forming apparatus 20 relayed by the session relay system 60 is established, thereby ensuring the improved security of this remote session.

The remote communication system 10 displays the screen identical to the screen displayed on the image forming apparatus 20 on the connection terminal 40 located outside the network to which the image forming apparatus 20 belongs so as to operate the image forming apparatus 20 from this connection terminal 40, thereby ensuring an easy operation of the image forming apparatus 20 from the connection terminal 40 located outside the network to which the image forming apparatus 20 belongs at a low cost. For example, the connection terminal 40 is configured to cause the user of the connection terminal 40 to execute various kinds of settings to the image forming apparatus 20, such as a setting of an address book of the image forming apparatus 20, by displaying a setting screen of the image forming apparatus 20 on the display 42. The connection terminal 40 is configured to cause the user of the connection terminal 40 to execute confirmations of various pieces of information of the image forming apparatus 20, such as a confirmation of errors occurred in the image forming apparatus 20, a confirmation of a printed count with the image forming apparatus 20, and a remaining amount of a toner in the image forming apparatus 20, by, for example, displaying a confirmation screen for the various pieces of information of the image forming apparatus 20 on the display 42. The connection terminal 40 is configured to cause the user of the connection terminal 40 to execute installing various kinds of software to the image forming apparatus 20, such as an installation of firmware to the image forming apparatus 20 and an installation of an application to the image forming apparatus 20, by, for example, displaying an installation screen of software to the image forming apparatus 20 on the display 42.

The connection terminal 40 can communicate with various kinds of applications in the image forming apparatus 20 by the remote session, thereby ensuring implementing various functions besides the maintenance to the image forming apparatus 20.

Since the test for the communication state via the remote session between the image forming apparatus 20 and the connection terminal 40 relayed by the session relay system 60, that is, the session communication state test is executed between the image forming apparatus 20 and the connection terminal 40 (Step S341), the remote communication system 10 can ensure an end-to-end communication reliability of the remote session relayed by the session relay system 60, thereby ensuring establishing the remote session with a stable quality. For example, since the session communication state test is executed between the image forming apparatus 20 and the connection terminal 40 before a proper remote session is established, when the properly established remote session is cut off when the execution result of the session communication state test is the error, the remote communication system 10 ensures causing the user to recognize that the cause of this cut off of the remote session possibly is not a failure in the application for using this remote session but an unstable network to which the image forming apparatus 20 belongs.

When the execution result of the session communication state test for the communication state via the remote session between the image forming apparatus 20 and the connection terminal 40 relayed by the session relay system 60, the remote communication system 10 notifies about the communication condition in the image forming apparatus 20 and the session relay system 60 of the information for this session communication state test (Step S346), thereby ensuring causing the user to recognize which position in the path of the remote session has a problem. For example, when a connecting position of the LAN to which the image forming apparatus 20 belongs to the Internet has a problem, the remote communication system 10 can cause the user to recognize it.

In the remote communication system 10, the session ID (which is also referred to as test ID) used in the WebSocket connection established between the image forming apparatus 20 and the session relay system 60 for the session communication state test and the session ID (which is also referred to as test ID) used in the WebSocket connection established between the connection terminal 40 and the session relay system 60 for the session communication state test are identical session IDs. This configuration eliminates the need for the remote communication system 10 to associate the session ID used in the WebSocket connection established between the image forming apparatus 20 and the session relay system 60 for the session communication state test with the session ID used in the WebSocket connection established between the connection terminal 40 and the session relay system 60 for the session communication state test in the session relay system 60, thereby ensuring simplified process of the session ID in the session relay system 60. The session ID used in the WebSocket connection established between the image forming apparatus 20 and the session relay system 60 for the session communication state test and the session ID used in the WebSocket connection established between the connection terminal 40 and the session relay system 60 for the session communication state test may be different from one another as long as they are associated with one another in the session relay system 60.

When the start of the session communication state test for the communication state via the remote session between the image forming apparatus and the connection terminal relayed by the session relay system 60 is requested by the connection terminal, the remote communication system 10 causes the image forming apparatus to install the server application for executing this session communication state test (Step S327), thereby ensuring executing the session communication state test for the communication state via the remote session established between the image forming apparatus in which this server application does not exist and the connection terminal.

Only when the installation of the server application for executing the session communication state test is approved by the user of the image forming apparatus with the application installation approval screen 76, the remote communication system 10 causes the image forming apparatus to install the server application for executing the session communication state test, thereby ensuring improving the security of the session communication state test.

The remote communication system 10 handles the approval of the installation of the server application for executing the session communication state test from the user of the image forming apparatus as the approval to start the session communication state test from the user of the image forming apparatus, thereby ensuring reducing a burden to the user of the image forming apparatus. The remote communication system 10 may be configured to accept the approval to start the session communication state test from the user of the image forming apparatus when accepting the approval of the installation of the server application for executing the session communication state test from the user of the image forming apparatus.

In the remote communication system 10, the server application for executing the session communication state test is installed in the image forming apparatus when this session communication state test is started and is uninstalled from the image forming apparatus when this session communication state test is terminated (Step S371), thereby ensuring reducing the use of the storage capacity of the image forming apparatus more than necessary.

According to the embodiment, the remote communication system 10 is configured to execute the remote maintenance as illustrated in FIG. 7. However, the remote communication system 10 is not necessarily configured to execute the remote maintenance as illustrated in FIG. 7.

According to the embodiment, in the remote communication system 10, the session management unit is implemented by the remote maintenance system 50. However, in the remote communication system 10, the session management unit may be implemented by a system other than the remote maintenance system 50, such as the session relay system 60.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A remote communication system comprising:
an image forming apparatus;
an electronic device located outside a network to which the image forming apparatus belongs;
a server computer that relays a remote session which is a direct interconnection between the image forming apparatus and the electronic device via a network; and
a session management unit that manages the remote session,
wherein the server computer notifies a first session ID and a second session ID to the session management unit, the first session ID and the second session ID being session IDs generated as the connection information to identify communication by the remote session in the server computer,
the session management unit executes a notification of the first session ID to the electronic device and a notification of the second session ID to the image forming apparatus,
the electronic device establishes an HTTP-based WebSocket connection with the server computer, the connection using the first session ID,
the image forming apparatus establishes an HTTP-based WebSocket connection with the session relay system, the connection using the second session ID,
the server computer is a remote communication system that relays the remote session by associating the WebSocket connection established with the electronic device with the WebSocket connection established with the image forming apparatus using the first session ID and the second session ID,
when a start of a test for a communication state via the remote session is requested by the electronic device, the session management unit requests a first test ID as the first session ID and a second test ID as the second session ID from the server computer,
when the remote session is relayed by the server computer by associating the WebSocket connection established between the electronic device and the server computer with the WebSocket connection established between the image forming apparatus and the server computer using the first test ID and the second test ID, the image forming apparatus executes the test for the communication state with the electronic device via the relayed session, and the electronic device notifies by displaying an execution result of the test on the display unit of the electronic device.

2. The remote communication system according to claim 1, wherein the remote session management unit obtains a communication condition of information for the test from the image forming apparatus and the server computer, and the electronic device notifies the communication condition obtained by the session management unit when the execution result of the test is an error.

3. The remote communication system according to claim 1, wherein when a start of the test is requested by the electronic device, the session management unit causes the image forming apparatus to install an application for executing the requested test.

4. The remote communication system according to claim 3, wherein the image forming apparatus uninstalls the application when the remote session is terminated.

5. The remote communication system according to claim 1, wherein the first test ID and the second test ID are identical test IDs.

6. The remote communication system according to claim 1, wherein the first session ID and the second session ID are identical session IDs.

* * * * *